US009906554B2

(12) United States Patent
Higbee et al.

(10) Patent No.: US 9,906,554 B2
(45) Date of Patent: *Feb. 27, 2018

(54) SUSPICIOUS MESSAGE PROCESSING AND INCIDENT RESPONSE

(71) Applicant: PhishMe, Inc., Leesburg, VA (US)

(72) Inventors: Aaron Higbee, Leesburg, VA (US);
Rohyt Belani, New York, NY (US);
Scott Greaux, Glenmont, NY (US);
William Galway, Scotch Plains, NJ (US); Douglas Hagen, Amherst, NY (US)

(73) Assignee: PhishMe, Inc., Leesburg, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/584,002

(22) Filed: May 1, 2017

(65) Prior Publication Data
US 2017/0237776 A1 Aug. 17, 2017

Related U.S. Application Data

(63) Continuation of application No. 14/986,515, filed on Dec. 31, 2015.

(60) Provisional application No. 62/145,778, filed on Apr. 10, 2015.

(51) Int. Cl.
*H04L 29/06* (2006.01)
*G06F 17/30* (2006.01)

(52) U.S. Cl.
CPC .... *H04L 63/1483* (2013.01); *G06F 17/30705* (2013.01); *H04L 63/0428* (2013.01); *H04L 63/1416* (2013.01); *H04L 63/1433* (2013.01); *H04L 63/20* (2013.01)

(58) Field of Classification Search
CPC . H04L 63/0435; H04L 63/14; H04L 63/1416; H04L 63/1433; H04L 63/1466; H04L 63/1483; H04L 63/20
See application file for complete search history.

(56) References Cited

U.S. PATENT DOCUMENTS

| 5,892,903 | A | 4/1999 | Klaus |
|---|---|---|---|
| 6,954,858 | B1 | 10/2005 | Welborn et al. |
| 7,281,031 | B1 | 10/2007 | Wang et al. |
| 7,325,252 | B2 | 1/2008 | Bunker et al. |
| 7,373,385 | B2 | 5/2008 | Prakash |

(Continued)

FOREIGN PATENT DOCUMENTS

| JP | 2006-285844 A | 10/2006 |
|---|---|---|
| JP | 2007-323640 A | 12/2007 |

(Continued)

OTHER PUBLICATIONS

Kumaraguru et al., Lessons From a Real World Evaluation of Anti-Phishing Training, 2004.*

(Continued)

*Primary Examiner* — Eleni Shiferaw
*Assistant Examiner* — Huan V Doan
(74) *Attorney, Agent, or Firm* — James Denaro

(57) ABSTRACT

The present invention relates to methods, network devices, and machine-readable media for an integrated environment for automated processing of reports of suspicious messages, and furthermore, to a network for distributing information about detected phishing attacks.

30 Claims, 17 Drawing Sheets

(56) References Cited

U.S. PATENT DOCUMENTS

| | | |
|---|---|---|
| 7,457,823 B2 | 11/2008 | Shraim et al. |
| 7,475,118 B2 | 1/2009 | Leiba et al. |
| 7,490,356 B2 | 2/2009 | Lieblich et al. |
| 7,496,634 B1 | 2/2009 | Cooley |
| 7,509,675 B2 | 3/2009 | Aaron |
| 7,562,222 B2 | 7/2009 | Gasparini et al. |
| 7,603,709 B2 | 10/2009 | Lewis et al. |
| 7,617,532 B1 | 11/2009 | Alexander et al. |
| 7,634,810 B2 | 12/2009 | Goodman et al. |
| 7,668,921 B2 | 2/2010 | Proux et al. |
| 7,681,234 B2 | 3/2010 | Florencio et al. |
| 7,685,631 B1 | 3/2010 | Paya et al. |
| 7,788,723 B2 | 8/2010 | Huddleston |
| 7,802,298 B1 | 9/2010 | Hong et al. |
| 7,841,003 B1 | 11/2010 | Emdee |
| 7,854,007 B2 | 12/2010 | Sprosts et al. |
| 7,865,958 B2 | 1/2011 | Lieblich et al. |
| 7,904,518 B2 | 3/2011 | Marino et al. |
| 7,925,883 B2 | 4/2011 | Florencio et al. |
| 7,958,555 B1 | 6/2011 | Chen et al. |
| 7,971,246 B1 | 6/2011 | Emigh et al. |
| 7,987,495 B2 | 7/2011 | Maler et al. |
| 8,103,627 B1 | 1/2012 | Qiu et al. |
| 8,132,011 B2 | 3/2012 | Gasparini et al. |
| 8,141,150 B1 | 3/2012 | Krishnamurthy |
| 8,181,232 B2 | 5/2012 | Grandcolas et al. |
| 8,191,148 B2 | 5/2012 | Oliver et al. |
| 8,209,381 B2 | 6/2012 | Sinn et al. |
| 8,220,047 B1 | 7/2012 | Soghoian et al. |
| 8,245,304 B1 | 8/2012 | Chen et al. |
| 8,271,007 B2 | 9/2012 | Cai et al. |
| 8,271,588 B1 | 9/2012 | Bruno et al. |
| 8,286,249 B2 | 10/2012 | Adelstein et al. |
| 8,291,065 B2 | 10/2012 | Goodman et al. |
| 8,296,376 B2 | 10/2012 | Goldberg et al. |
| 8,321,934 B1 | 11/2012 | Cooley et al. |
| 8,327,421 B2 | 12/2012 | Ting |
| 8,332,918 B2 | 12/2012 | Vedula et al. |
| 8,365,246 B2 | 1/2013 | Readshaw |
| 8,381,293 B2 | 2/2013 | Emigh et al. |
| 8,407,798 B1 | 3/2013 | Lotem et al. |
| 8,423,483 B2 | 4/2013 | Sadeh-Koniecpol et al. |
| 8,438,642 B2 | 5/2013 | Feng et al. |
| 8,464,346 B2 | 6/2013 | Barai et al. |
| 8,464,352 B2 | 6/2013 | Toomey |
| 8,468,244 B2 | 6/2013 | Redlich et al. |
| 8,484,741 B1 * | 7/2013 | Chapman ............ G06Q 10/0635 709/206 |
| 8,484,744 B1 | 7/2013 | De et al. |
| 8,495,747 B1 | 7/2013 | Nakawatase et al. |
| 8,554,847 B2 | 10/2013 | Shue |
| 8,566,938 B1 | 10/2013 | Prakash et al. |
| 8,608,487 B2 | 12/2013 | Huie et al. |
| 8,615,807 B1 | 12/2013 | Higbee et al. |
| 8,621,614 B2 | 12/2013 | Vaithilingam et al. |
| 8,635,666 B2 | 1/2014 | Curnyn |
| 8,635,703 B1 | 1/2014 | Belani et al. |
| 8,640,231 B2 | 1/2014 | Florencio et al. |
| 8,713,677 B2 | 4/2014 | Soghoian et al. |
| 8,719,940 B1 | 5/2014 | Higbee et al. |
| 8,776,196 B1 | 7/2014 | Oliver et al. |
| 8,782,796 B2 | 7/2014 | Hawthorn et al. |
| 8,793,799 B2 | 7/2014 | Fritzson et al. |
| 8,826,444 B1 | 9/2014 | Kalle |
| 8,839,369 B1 | 9/2014 | Dai et al. |
| 8,856,869 B1 | 10/2014 | Brinskelle |
| 8,910,281 B1 | 12/2014 | Aharoni et al. |
| 8,910,287 B1 | 12/2014 | Belani et al. |
| 8,966,637 B2 | 2/2015 | Belani et al. |
| 8,990,933 B1 | 3/2015 | Magdalin |
| 9,015,472 B1 | 4/2015 | Chasin |
| 9,154,514 B1 | 10/2015 | Prakash |
| 9,160,766 B2 | 10/2015 | Kashyap et al. |
| 9,177,314 B2 | 11/2015 | Uzo |
| 9,202,249 B1 | 12/2015 | Cohen et al. |
| 9,224,117 B2 | 12/2015 | Chapman |
| 9,245,115 B1 | 1/2016 | Jakobsson |
| 9,270,696 B2 | 2/2016 | Fritzson et al. |
| 9,280,911 B2 | 3/2016 | Sadeh-Koniecpol et al. |
| 9,325,730 B2 | 4/2016 | Higbee et al. |
| 9,373,267 B2 | 6/2016 | Sadeh-Koniecpol et al. |
| 9,398,029 B2 | 7/2016 | Sadeh-Koniecpol et al. |
| 9,398,038 B2 | 7/2016 | Higbee et al. |
| 9,473,437 B1 | 10/2016 | Jakobsson |
| 9,547,998 B2 | 1/2017 | Sadeh-Koniecpol et al. |
| 9,591,017 B1 | 3/2017 | Higbee et al. |
| 2002/0091940 A1 | 7/2002 | Welborn et al. |
| 2005/0132225 A1 | 6/2005 | Gearhart |
| 2005/0154601 A1 | 7/2005 | Halpern et al. |
| 2005/0183143 A1 | 8/2005 | Anderholm et al. |
| 2005/0204005 A1 | 9/2005 | Purcell et al. |
| 2005/0268100 A1 | 12/2005 | Gasparini et al. |
| 2006/0053203 A1 | 3/2006 | Mijatovic |
| 2006/0075028 A1 | 4/2006 | Zager et al. |
| 2006/0075504 A1 | 4/2006 | Liu |
| 2006/0080735 A1 | 4/2006 | Brinson et al. |
| 2006/0095521 A1 | 5/2006 | Patinkin |
| 2006/0101120 A1 | 5/2006 | Helsper et al. |
| 2006/0123464 A1 | 6/2006 | Goodman et al. |
| 2006/0123478 A1 | 6/2006 | Rehfuss et al. |
| 2006/0168066 A1 | 7/2006 | Helsper et al. |
| 2006/0174119 A1 | 8/2006 | Xu |
| 2006/0184632 A1 | 8/2006 | Marino et al. |
| 2006/0218000 A1 | 9/2006 | Smith et al. |
| 2006/0225136 A1 | 10/2006 | Rounthwaite et al. |
| 2006/0251068 A1 | 11/2006 | Judge et al. |
| 2006/0271631 A1 | 11/2006 | Qureshi et al. |
| 2007/0005702 A1 | 1/2007 | Tokuda et al. |
| 2007/0006305 A1 | 1/2007 | Florencio et al. |
| 2007/0039038 A1 | 2/2007 | Goodman et al. |
| 2007/0079379 A1 | 4/2007 | Sprosts et al. |
| 2007/0107053 A1 | 5/2007 | Shraim et al. |
| 2007/0136806 A1 | 6/2007 | Berman |
| 2007/0192855 A1 | 8/2007 | Hulten et al. |
| 2007/0199054 A1 | 8/2007 | Florencio et al. |
| 2007/0220599 A1 | 9/2007 | Moen et al. |
| 2007/0234061 A1 | 10/2007 | Teo |
| 2007/0245422 A1 | 10/2007 | Hwang et al. |
| 2007/0250618 A1 | 10/2007 | Hammond |
| 2007/0294352 A1 | 12/2007 | Shraim et al. |
| 2008/0037583 A1 | 2/2008 | Dawes et al. |
| 2008/0037791 A1 | 2/2008 | Jakobsson |
| 2008/0040274 A1 | 2/2008 | Uzo |
| 2008/0046970 A1 | 2/2008 | Oliver et al. |
| 2008/0047017 A1 | 2/2008 | Renaud |
| 2008/0052359 A1 | 2/2008 | Golan et al. |
| 2008/0141342 A1 | 6/2008 | Curnyn |
| 2008/0168546 A1 | 7/2008 | Almeida |
| 2008/0172382 A1 | 7/2008 | Prettejohn |
| 2008/0177994 A1 | 7/2008 | Mayer |
| 2008/0184349 A1 | 7/2008 | Ting |
| 2008/0244715 A1 | 10/2008 | Pedone |
| 2008/0271124 A1 | 10/2008 | Nisbet et al. |
| 2008/0276315 A1 | 11/2008 | Shuster |
| 2008/0288303 A1 | 11/2008 | Gray et al. |
| 2008/0288330 A1 | 11/2008 | Hildebrand et al. |
| 2008/0301776 A1 | 12/2008 | Weatherford |
| 2009/0013041 A1 | 1/2009 | Farmer et al. |
| 2009/0089859 A1 | 4/2009 | Cook et al. |
| 2009/0144308 A1 | 6/2009 | Huie et al. |
| 2009/0172772 A1 | 7/2009 | Souille |
| 2009/0198783 A1 | 8/2009 | Bloomer, Jr. et al. |
| 2009/0240774 A1 | 9/2009 | Sachtjen et al. |
| 2009/0241168 A1 | 9/2009 | Readshaw |
| 2009/0241173 A1 | 9/2009 | Troyansky |
| 2009/0259725 A1 | 10/2009 | Rabinovich |
| 2009/0265430 A1 | 10/2009 | Bechtel et al. |
| 2009/0282112 A1 | 11/2009 | Prakash |
| 2009/0292925 A1 | 11/2009 | Meisel |
| 2009/0300768 A1 | 12/2009 | Krishnamurthy et al. |
| 2009/0318130 A1 | 12/2009 | Naylor et al. |
| 2009/0319247 A1 | 12/2009 | Ratcliffe, III et al. |
| 2009/0319647 A1 | 12/2009 | White et al. |
| 2009/0320137 A1 | 12/2009 | White et al. |

(56) References Cited

U.S. PATENT DOCUMENTS

| | | |
|---|---|---|
| 2009/0328208 A1 | 12/2009 | Peters |
| 2010/0017616 A1 | 1/2010 | Nichols et al. |
| 2010/0031041 A1 | 2/2010 | Cohen |
| 2010/0043071 A1 | 2/2010 | Wang |
| 2010/0064341 A1 | 3/2010 | Aldera |
| 2010/0083383 A1 | 4/2010 | Adler et al. |
| 2010/0088513 A1 | 4/2010 | Hunneybell |
| 2010/0100962 A1 | 4/2010 | Boren |
| 2010/0125911 A1 | 5/2010 | Bhaskaran |
| 2010/0138499 A1 | 6/2010 | Belz et al. |
| 2010/0138925 A1 | 6/2010 | Barai et al. |
| 2010/0154055 A1 | 6/2010 | Hansen |
| 2010/0183004 A1 | 7/2010 | Kobayashi |
| 2010/0205014 A1 | 8/2010 | Sholer et al. |
| 2010/0211641 A1 | 8/2010 | Yih et al. |
| 2010/0235918 A1 | 9/2010 | Mizrahi et al. |
| 2010/0281536 A1 | 11/2010 | Richards et al. |
| 2010/0299292 A1 | 11/2010 | Collazo |
| 2010/0306845 A1 | 12/2010 | Vaithilingam et al. |
| 2010/0313266 A1 | 12/2010 | Feng et al. |
| 2011/0030059 A1 | 2/2011 | Greenwald |
| 2011/0055922 A1 | 3/2011 | Cohen et al. |
| 2011/0061089 A1 | 3/2011 | O'Sullivan et al. |
| 2011/0072262 A1 | 3/2011 | Amir et al. |
| 2011/0078795 A1 | 3/2011 | Liu |
| 2011/0083182 A1 | 4/2011 | Emdee |
| 2011/0093546 A1 | 4/2011 | Rubingh |
| 2011/0130127 A1 | 6/2011 | Worth et al. |
| 2011/0184877 A1 | 7/2011 | McHugh et al. |
| 2011/0191847 A1 | 8/2011 | Davis et al. |
| 2011/0225652 A1 | 9/2011 | Emigh et al. |
| 2011/0238855 A1 | 9/2011 | Korsunsky et al. |
| 2011/0246634 A1 | 10/2011 | Liu et al. |
| 2012/0023566 A1 | 1/2012 | Waterson et al. |
| 2012/0030750 A1 | 2/2012 | Bhargava et al. |
| 2012/0096553 A1 | 4/2012 | Srivastava et al. |
| 2012/0124671 A1 | 5/2012 | Fritzson et al. |
| 2012/0174235 A1 | 7/2012 | Hamilton, II et al. |
| 2012/0254995 A1 | 10/2012 | Sallam |
| 2012/0258437 A1 | 10/2012 | Sadeh-Koniecpol et al. |
| 2012/0311669 A1 | 12/2012 | Akase |
| 2012/0311703 A1 | 12/2012 | Yanovsky et al. |
| 2012/0324568 A1 | 12/2012 | Wyatt et al. |
| 2012/0324576 A1 | 12/2012 | Clark et al. |
| 2013/0018972 A1 | 1/2013 | Sargent et al. |
| 2013/0031627 A1 | 1/2013 | Wang et al. |
| 2013/0086677 A1 | 4/2013 | Ma et al. |
| 2013/0110614 A1 | 5/2013 | Wagner et al. |
| 2013/0132857 A1 | 5/2013 | Shapiro |
| 2013/0145462 A1 | 6/2013 | Hsu et al. |
| 2013/0145465 A1 | 6/2013 | Wang et al. |
| 2013/0191473 A1 | 7/2013 | Wilson et al. |
| 2013/0198822 A1 | 8/2013 | Hitchcock et al. |
| 2013/0198846 A1 | 8/2013 | Chapman |
| 2013/0203023 A1 | 8/2013 | Sadeh-Koniecpol et al. |
| 2013/0238521 A1 | 9/2013 | Graupner et al. |
| 2013/0268470 A1 | 10/2013 | Yablokov et al. |
| 2013/0297375 A1 | 11/2013 | Chapman |
| 2013/0325991 A1 | 12/2013 | Chambers et al. |
| 2013/0333028 A1 | 12/2013 | Hagar et al. |
| 2013/0333030 A1 | 12/2013 | Farris |
| 2014/0046645 A1 | 2/2014 | White et al. |
| 2014/0082726 A1 | 3/2014 | Dreller et al. |
| 2014/0101236 A1 | 4/2014 | Dietrich et al. |
| 2014/0189030 A1 | 7/2014 | Benchenaa et al. |
| 2014/0189820 A1 | 7/2014 | Pieczul et al. |
| 2014/0199663 A1 | 7/2014 | Sadeh-Koniecpol et al. |
| 2014/0199664 A1 | 7/2014 | Sadeh-Koniecpol |
| 2014/0222928 A1 | 8/2014 | Scholtes et al. |
| 2014/0230050 A1 | 8/2014 | Higbee et al. |
| 2014/0230064 A1 | 8/2014 | Higbee et al. |
| 2014/0230065 A1 | 8/2014 | Belani et al. |
| 2014/0280624 A1 | 9/2014 | Dillingham et al. |
| 2014/0337995 A1 | 11/2014 | Fritzson et al. |
| 2014/0373142 A1 | 12/2014 | Zheleva |
| 2015/0032829 A1 | 1/2015 | Barshow et al. |
| 2015/0229664 A1* | 8/2015 | Hawthorn ........... H04L 63/1408 726/25 |
| 2015/0287336 A1 | 10/2015 | Scheeres |
| 2015/0373039 A1 | 12/2015 | Wang |
| 2016/0014151 A1* | 1/2016 | Prakash ............. H04L 63/1483 726/22 |
| 2016/0036829 A1 | 2/2016 | Sadeh-Koniecpol |
| 2016/0078377 A1 | 3/2016 | Chapman |
| 2016/0156656 A1 | 6/2016 | Boggs et al. |
| 2016/0234245 A1 | 8/2016 | Chapman |
| 2016/0301716 A1 | 10/2016 | Sadeh-Koniecpol et al. |
| 2016/0308897 A1 | 10/2016 | Chapman |

FOREIGN PATENT DOCUMENTS

| | | |
|---|---|---|
| WO | 2011/017196 A2 | 2/2011 |
| WO | 2012/068255 A2 | 5/2012 |

OTHER PUBLICATIONS

Alnajim, Abdullah, et al., "An Anti-Phishing Approach that Uses Training Intervention for Phishing Websites Detection," 2009 Sixth International Conference on Information Technology: New Generations, 2009, DD. 405-410, IEEE, USA.

Toolan, Fergus, et al., "Feature Selection for Spam and Phishing Detection," 2010 eCrime Researchers Summit, 2010, pp. 1-12, IEEE, USA.

Fette, Ian, et al., "Learning to Detect Phishing Emails," Carnegie Mellon Cyber Laboratory Technical Report CMU-CYLAB-06-012, Jun. 2006, pp. 1-12, Carnegie Mellon University, PA, USA.

Soni, Pravin, et al., "A Phishing Analysis of Web Based Systems," ICCCS'Feb. 12-14, 2011, Rourke/a, Odisha, India, 2011, pp. 527-530, ACM, USA.

Alnajim, A., et al., "An Approach to the Implementation of the Anti-Phishing Tool for Phishing Websites Detection," International Conference on Intelligent Networking and Collaborative Systems, 2009, p. 105-112, IEEE, USA.

He, Mingxing, et al., "An efficient phishing webpage detector," Expert Systems with Applications, 2011, pp. 12018-12027, vol. 38, Elsevier Ltd., UK.

Zhang, Yue, et al., "Cantina: A Content-Based Approach to Detecting Phishing Web Sites," Proceedings of the 16th International Conference on World Wide Web, May 8-12, 2007, Banff, Alberta, Canada, May 2007, pp. 639-648, ACM, USA.

Wenyin, Liu, et al., "Detection of Phishing Webpages based on Visual Similarity," 14th International Conference on World Wide Web, May 10-14, 2005, Chiba, Japan, DD. 1060-1061, ACM, USA.

Parno, Bryan, et al., "Phoolproof Phishing Prevention," CyLab Carnegie Mellon University, Dec. 3, 2005, 16 pages, Carnegie Mellon University, PA, USA.

Dhamija, Rachna, et al., "The Battle Against Phishing: Dynamic Security Skins," Symposium on Usable Privacy and Security (SOUPS) 2005, Jul. 6-8, 2005, Pittsburgh, PA, USA, 12 pages.

Huang, Chun-Ying, et al., "Using one-time passwords to prevent password phishing attacks," Journal of Network and Computer Applications, 2011, DD. 1-10, Elsevier B.V., NL.

Jackson, Collin, et al., "An Evaluation of Extended Validation and Picture-in-Picture Phishing Attacks," Financial Cryptography and Data Security, 2007, 13 pages, Springer-Verlag, DE.

Kang, Le, et al., "Captcha Phishing: A Practical Attack on Human Interaction Proofing," Inscrypt 2009, LNCS 6151, 2010, pp. 411-425, Springer-Verlag, DE.

Dazeley, Richard, et al, "Consensus Clustering and Supervised Classification for Profiling Phishing Emails in Internet Commerce Security," PKAW 2010, LNAI 6232, 2010, pp. 235-246, Springer-Verlag, DE.

Jakobsson, Markus, "Modeling and Preventing Phishing Attacks," FC'05 Proceedings of the 9th international conference on Financial Cryptography and Data Security, 2005, pp. 1-19.

Ohamija, Rachna, et al., "Why Phishing Works," Proceeding ofCHI-2006: Conference on Human Factors in computing Systems, Apr. 2006, 10 pages.

(56) References Cited

OTHER PUBLICATIONS

Wu, Min, et al., "Do Security Toolbars Actually Prevent Phishing Attacks?," CHI 2006, Apr. 22-27, 2006, Montreal, Quebec, Canada, 2006, 10 pages, ACM, USA.

Zhang, Yue et al., "Phinding Phish: Evaluating Anti-Phishing Tools," Proceedings of the 14th Annual Network and Distributed System Security Symposium (NOSS 2007), 2007, 16 pages.

Egelman, Serge, et al., "You've Been Warned: An Empirical Study of the Effectiveness of Web Browser Phishing Warnings," CHI 2008, Apr. 5-10, 2008, Florence, Italy, 2008, 10 pages, ACM, USA.

Downs, Julie, et al., "Decision Strategies and Susceptibility to Phishing," Symposium on Usable Privacy and Security (SOUPS), Jul. 12-14, 2006, Pittsburgh, PA, USA, 2006, 12 pages.

Wright, Ryan, et al., "The Influence of Experiential and Dispositional Factors in Phishing: An Empirical Investigation of the Deceived," Journal of Management Information Systems, Summer 2010, IPP. 273-303, vol. 27, No. 1, M.E. Sharpe, Inc., USA.

Sheng, Steve, et al., "Who Falls for Phish? A Demographic Analysis of Phishing Susceptibility and Effectiveness of Interventions," CHI 2010, Apr. 10-15, 2010, Atlanta, Georgia, USA, 2010, 10 pages, ACM, USA.

Vishwanath, Arun, et al., "Why do people get phished? Testing individual difference in phishing vulnerability within an integrated, information processing model," Decision Support Systems, 2011, IDD. 576-586, vol. 51, Elsevier B.V., NL.

Alnajim, Abdullah, et al., "An Evaluation of Users' Anti-Phishing Knowledge Retention," 2009 International conference on Information Management and Engineering, 2009, pp. 210-214, IEEE, USA.

Sheng, Steve, et al., "Anti-Phishing Phil: The Design and Evaluation of a Game That Teaches People Not to Fall for Phish," Symposium on Usable Privacy and Security (SOUPS) 2007, Jul. 18-20, 2007, Pittsburgh, PA, USA, 2007, 12 pages.

Kumaraguru, Ponnurangam, et al., "Protecting People from Phishing: The Design and Evaluation of an Embedded Training Email System," Proceeding of the SIGCHI Conference on Human Factors in Computing Systems, Apr. 2007, pp. 1-10, ACM, USA.

Blom, Elma, et al., "Dummy auxiliaries in child and adult second language acquisition of Dutch," Lingua, 2011, pp. 306-919, vol. 121, Elsevier B.V., NL.

Radford, Andrew, et al., "On the Acquisition of Universal and Parameterised Goal Accessibility Constraints by Japanese Learners of English," Essex Research Reports in Linguistics, Mar. 2011, 46 pp. (cover and second page, and DD. 1-44), vol. 60, No. 5, University of Essex, UK.

Dominiguez, Laura, et al., "Testing the Predictions of the Feature Assembly Hypothesis Evidence from the L2 Acquisition of Spanish Aspect Morphology," Proceedings of the Boston University Conference on Language Development, 2011, 14 pages, vol. 35, Cascadilla Press, MA, USA.

Bliton, Daniel, et al., "Unannounced Phishing Exercises and Targeted Training: Results and Lessons Learned," Interservice/Industry Training, Simulation, and Education Conference (11/TSEC), 2011, pp. 1-11, Paper No. 11342, I/ITSEC, USA.

Adams, Elizabeth, et al., "Brief Overview: Mandatory Training-A Systematic Review of Research NPL and Trends in Learning Organizations," Veterans Health Administration Office of Patient Care Services Technology Assessment Program, TAP Brief Overview, Mar. 2010, 23 pages (cover page, pp. i-iii, and pp. 1-19), VA Technology Assessment Program, Boston, MA, USA.

Ferguson, Aaron J., "Fostering E-Mail Security Awareness: The West Point Carronade," Educause Quarterly, 2005, pp. 54-57, vol. 28, No. 1, Educause Online Publication, http://www.educause.edu/eq.

Hidi, Suzanne, et al., "Strategies for increasing text-based interest and students' recall of expository texts," Reading Research Quarterly, Fall 1988, pp. 465-483, XX.111/4, International Reading Association, Delaware, USA.

Klevinsky, T. J., et al., Chapter 3—Penetration for Hire, Hack L T.—Security Through Penetration Testing, 2002, DD. 25-27, Addison-Wesley Professional, Pearson Education Ltd, USA.

Sadoski, Mark, "Resolving the Effects of Concreteness on Interest, Comprehension, and Learning Important Ideas From Text," Educational Psychology Review, 2001, pp. 263-281, vol. 13, No. 3, Plenum Publishing Corporation, NY, USA.

Simulating malicious emails to educate end users on-demand, Jansson, Kenny; Von Solms, Rossouw, IEEE Symposium on Web Society, p. 74-80, 2011; 2011 3rd Symposium on Web Society, SWS2011, Oct. 26, 2011-Oct. 28, 2011, Institute for ICT Advancement, Nelson Mandela Metropolitan University, Port Elizabeth, South Africa.

School of phish: a real-world evaluation of anti-phishing training, Ponnurangam Kumaraguru; Justin Cranshaw; Alessandro Acquisti; Lorrie Cranor; Jason Hong; Mary Ann Blair; Theodore Pham, Carnegie Mellon University, SOUPS 2009 Proceedings of the 5th Symposium on Usable Privacy and Security.

Design a mobile game for home computer users to prevent from "phishing attacks", Arachchilage, Nalin Asanka Gamagedara; Cole, Melissa, International Conference on Information Society, i-Society 2011, p. 485-489, 2011, International Conference on Information Society, i-Society 2011, Jun. 27, 2011-Jun. 29, 2011.

P. Kumaraguru, S. Sheng, A. Acquisti, L. F. Cranor, and J. Hong. "Lessons from a real world evaluation of anti-phishing training." e-Crime Researchers Summit, Anti-Phishing Working Group, Oct. 2008.

Robertson, "Amid the VIPERS Establishing Malware's Position Within the Information Ecosystem", 54 pages, 2011.

Sheng et al., "Anti-Phishing Phil: The Design and Evaluation of a Game That Teaches People Not to Fall for Phish", 14 pgs, 2007.

Spinapolice, "Mitigating the Risk of Social Engineering Attacks", 67 pgs. 2011.

Trevor, "Stratum Security, Announcing ThreatSim—Stratum's Spear Phishing and Data Exfiltration SaaS Offering", 1 pg, 2013.

Alex Tsow and Markus Jakobsson, "Deceit and Deception: A Large User Study of Phishing", 46 pages, 2007.

Wombat Security Technologies, "Wombat Security Technologies Offers Tips, Training, and Free Simulated Phishing Attacks to Help Companies and their Employees Avoid Holiday Phishing Scams", 3 pages, 2011.

Steve Sheng, Mandy Holbrook, Ponnurangam Kumaraguru, Lorrie Cranor, Julie Downs, "Who Falls for Phish? A Demographic Analysis of Phishing Susceptibility and Effectiveness of Interventions" CHI 2010, Apr. 10-15, 2010, Atlanta, GA, USA, 10 pages.

"Phishme: The Easy Way to Enhance Employee Phishing Awareness", http://www.brighthub.com/computing/enterprise-security/reviews/5298.aspx; Jul. 4, 2011; accessed Jul. 23, 2013; 3 pages.

"What is PhishMe?", http://phishme.com/whatisphishme.html; 2008; accessed Jul. 23, 2013; 2 pages.

Aaron Higbee, "phishme.com—Techincal Paper", 2009, 10 pages.

Art Fritzson et al, U.S. Appl. No. 61/414,142, filed Nov. 16, 2010 (including "Phishing Awareness Training" (2010).

K.Jansson and R. von Solms, "Social Engineering: Towards a Holistic Solution," presented at the South African Information Security Multi-Conference, Port Elizabeth, South Africa, 2010.

"WhiteGold goes fishing for phishing", www.amnet.com.au/article/299134/whitegold_goes_fishing_phishing/, Apr. 14, 2009; accessed Jul. 23, 2013; 3 pages.

"United States Military Academies to Use PhishMe to Combat Spear Phishing", msmvps.com/blogs/donna/archive/2009/07/24/united-states-military-academies-to-use-phishme-to-combat-spear-phishing.aspx; Jul. 24, 2009; accessed Jul. 24, 2013; 1 pg.

Brian M. Bowen et al., "Measuring the Human Factor of Cyber Security", Department of Computer Science Columbia University, 2011, 6 pages.

"What is PhishMe?"; Nov. 4, 2011; accessed at http://web.archive.org/web/20111104184530/http://www.phishme.com/what_is_phishme.php on May 9, 2015, 2 pgs.

Images from PhishMe Shockwave Animation (2008), 4 pages.

Jansson,Kenny, "A Model for Cultivating Resistance to Social Engineering Attacks", Dissertation, Sep. 2011, with attachments.

"Anti-phishing training adds attachments to mix", www.networkworld.com/news/2009/090209-anti-phishing-training-adds-attachments-to.html; 2009; accessed Sep. 9, 2013, 3 pages.

(56) References Cited

OTHER PUBLICATIONS

"Core Impact penetration tester goes phishing", InfoWorld, Jan. 7, 2008, 2 pages.
"Core Impact 7.5", www.infoworld.com/print/31390, Sc Magazine, Aug. 2008, 1 page.
Victor Garza, "Product review: Core Impact penetration tester goes phishing"; 2008; www.infoworld.com/print/31390; accessed Sep. 9, 2013; 3 pages.
Markus Jakobsson et al., "Designing Ethical Phishing Experiments: A study of (ROT13) rOnl query features", Indiana University, Bloomington, IN 47406, USA, WWW 2006, May 23-26, 2006, Edinburgh, Scotland, ACM 1595933239/06/0005., 10 pages.
"To defeat phishing, Energy learns to phish", 2011, gcn.com/Articles/2011/06/13/DOE-Phishing-Test.aspx?p=1, accessed Sep. 9, 2013, 3 pages.
"Humans are the Front Line' against Phishing for Intrepidus Group", 2010, blog.executivebiz.com/2010/03/humans-are-the-front-line-against-phishing-for-intrepidus-group/, accessed Sep. 9, 2013, 3 pages.
"InfoSec: 23 percent of users fall for spear phishing", 2009, www.scmagazine.com/infosec-23-percent-of-users-fall-for-spear-phishing/article/128480/#, accessed Sep. 9, 2013, 3 pages.
"Intrepidus Group and BrandProtect Partner to Offer Holistic Anti-Phishing Solution", 2009, www.redorbit.com/news/technology/1670312/intrepidus_group_and_brandprotect_partner_to_offer_holistic_antiphishing_solution/, accessed Sep. 9, 2013, 3 pages.
Ponnurangam Kumaraguru, "PhishGuru: A System for Educating Users about Semantic Attacks", 2009 dissertation, School of Computer Science, Institute for Software Research, Carnegie Mellon University, Pittsburgh, PA 15213, 198 pages.
"Phishing for user security awareness" Dodge, Ronald C.; Carver, Curtis; Ferguson, Aaron J. Computers & Security , vol. 26 (1), Elsevier, Feb. 1, 2007, 8 pages.
"One-Quarter of Worldwide Population at Risk of Spear Phishing Attacks", Mar. 9, 2009, www.certmag.com/read. php?in=5245, accessed Sep. 9, 2013, 2 pages.
Thomas Clabum, "Phish Your Colleagues With PhishMe", Jul. 22, 2008, www.informationweek.com/security/client/phish-your-colleagues-with-phishme/209400255, accessed Sep. 9, 2013, 2 pages.
K. Jansson and R. von Solms, "Phishing for phishing awareness", accepted author version posted online: Oct. 19, 2011; published online: Nov. 9, 2011, 18 pages.
"PhishMe.com Overview", 2010.
"Phishme.com Internal Communication", 2008, ha.ckers.org/blog/20080306/phishmecom-internal-communication/, accessed Sep. 9, 2013, 5 pages.
Phishme,com, "Introduction to PhishMe.com", Nov. 2010, 15 pages.
[reserved].
Lori Faith Cranor, "Can Phishing Be Foiled?", Scientific American, Dec. 2008, 7 pages.
"Social Phishing" Tom N. Jagatic, Nathaniel A. Johnson, Markus Jakobsson, Filippo Menczer Communications of the ACM, vol. 50 No. 10, pp. 94-100, Oct. 2007.
"Reduce the risk from targeted phishing and malware attacks. On demand.", Stratum Security, 2011, 2 pages.
"ThreatSim: Executive Summary", Stratum Security, 2011, 6 pages.
K. Jansson and R. von Solms, "Towards a Social Engineering Resistant User Model," presented at 13th Annual conference on WWW Applications, Johannesburg, South Africa (2011).
"An Empirical Evaluation of PhishGuruTM Embedded Training" Wombat Security Technologies, Apr. 2009, 12 pages.
"What is PhishMe?", Interpidus Group, 2009, 1 page.
Rohyt Belani, "Spear Phishing Train Your Workforce to Dodge the Hook" 2009, 26 pages.
"Phishme.com Internal Communication", ha.ckers.org web application security lab, Mar. 6, 2008, 5 pgs.

"How PhishMe Works", Dec. 4, 2011, accessed at http://web.archive.org/web/20111204012721/http://phishme.com/how_phishme_works.php on May 9, 2015, 2 pgs.
How to Create a Self-Signed Digital Certificate in Microsoft Office 2010, Nov. 20, 2010.
Building an encrypted and searchable audit log, 11th Annual Network and Distributed Security Symposium (NDSS 04), Feb. 5-6, 2004.
Automatically Encrypting all Incoming Email; Jan. 13, 2011.
Alberto Trevino, Spam Filtering Through Header Relay Detection, Mar. 2007.
"Establishing the Human Firewall: Reducing an Individual's Vulnerabiliity to Social Engineering Attacks", Scheeres, Jamison W., Air Force Institute of Technology, Mar. 2008.
Handl, Bc Marek. "Spam identification independent of email body contents." Diss. Master's thesis, Czech Technical University in Prague, Faculty of Electrical Engineering, Department of Computer Science and Engineering, 2010.
"Phishing Defenses for Webmail Providers", Rich Graves, Jun. 2012, accepted Jan. 20, 2013.
"Woops! Army's attempt at a phishing simulation bombs", Mar. 14, 2014, Aaron Higbee; accessed at http://phishme.aorn/woopsarmysattemptphishingsimulationbombs/ on Feb. 8, 2016.
"Phishing Detection Plug-In Toolbar Using Intelligent Fuzzy-Classification Mining Techniques"; Aburrous, M.; Khelifi, A.; International Journal of Soft Computing and Software Engineering, v 3, n 3; Mar. 2013.
"PhiGARo: Automatic Phishing Detection and Incident Response Framework"; Availability, Reliability and Security ARES), 2014 Ninth International Conference, Sep. 8-12, 2014.
"Client-Side Defense Against Web-Based Identity Theft"; Neil Chou , Robert Ledesma , Yuka Teraguchi , John C. Mitchell; 2004.
"PhishCatch—A phishing detection tool"; Yu, W.D.; Nargundkar, S.; Tiruthani, N.; Proceedings 2009 33rd Annual IEEE International Computer Software and Applications Conference.
Art Fritzson et al, U.S. Appl. No. 61/502,678, filed Jun. 29, 2011, 62 pgs. (including "Phishing Awareness Training" (2010), "Unannounced Phishing Exercises and Targeted Training" (2011), "Automated Test Case Generator for Phishing Prevention" (2011)).
U.S. Appl. No. 61/729,991, "Determining Risk Exposure and Avoiding Fraud", by Bjorn Markus Jakobsson, filed Nov. 26, 2012.
U.S. Appl. No. 61/597,972, "Protecting Computer and Other Device Users", by Bjorn Markus Jakobsson and Karl Hampus Jakobsson, filed Feb. 13, 2012.
U.S. Appl. No. 61/729,991, "Determining Risk Exposure and Avoiding Fraud", by Bjorn Markus Jakobsson, filed Nov. 26, 2012.
U.S. Appl. No. 61/597.972, "Protecting Computer and Other Device Users", by Bjorn Markus Jakobsson and Karl Hampus Jakobsson, filed Feb. 13, 2012.
"How it Works | ThreatSim", available Jan. 15, 2012; accessed via archive.org at https://web.archive.org/web/20120115014307/http://threatsim.com/how-it-works on Feb. 26, 2016.
"Features I ThreatSim", available Jan. 15, 2012; accessed via archive.org at https://web.archive.org/web/20120115181806/http://www.threatsim.com/features on Feb. 26, 2016.
"Home | ThreatSim", available Jan. 14, 2012; accessed via archive.org at https://web.archive.org/web/20120114191637/http://www.threatsim.com/ on Feb. 26, 2016.
ThreatSim Product Overview, stratum//security, 2011.
ThreatSim Data Sheet, stratum//security, 2011.
Answer to Second Amended Complaint and Counterclaims, U.S. District Court for the District of Delaware, Case 1:16-mf-00403-LPS-CJB, Document 18, Filed Sep. 20, 2016, 34 pages.
"Cisco IronPort Email Security Plug-in 7.1 Administrator Guide", Dec. 6, 2010, U.S. District Court for the District of Delaware, Case 1:16-cv-00403-LPS-CJB, Document 18-6, Filed Sep. 20, 2016, 81 pages.
Opposition to Phishme's Motion to Dismiss Wombat's State Law and Lanham Act Counterclaims, Case 1:16-cv-00403-LPS-CJB, Document 23, Filed Oct. 31, 2016, 27 pages.
"PhishGuru: A System for Educating Users about Semantic Attacks", Ponnurangam Kumaraguru, Apr. 14, 2009, U.S. District

(56) References Cited

OTHER PUBLICATIONS

Court for the District of Delaware, Case 1:16-cv-00403-LPS-CJB, Document 18-3, Filed Sep. 20, 2016, 112 pages.
International Search Report, Search Strategy, and Written Opinion of the International Search Authority in PCT/US2016/026817 (WO2016164844), dated Aug, 12, 2016, 18 pgs.
U.S. Appl. No. 62/185,299, filed Jun. 26, 2015.
U.S. Appl. No. 62/147,414, filed Apr. 14, 2015.
U.S. Appl. No. 62/135,990, filed Mar. 20, 2015.
U.S. Appl. No. 62/114,744, filed Feb. 11, 2015.
U.S. Appl. No. 62/112,503, filed Feb. 5, 2015.
Petition for Post-Grant Review of U.S. Pat. No. 9,398,038 in PGR2017-00009, submitted Jan. 3, 2017, 101 pgs.
Declaration of Dr. Aviel Rubin, 144 pgs. (PGR Ex 1002).
File History of U.S. Pat. No. 9,398,038 from PAIR (without non-patent literature), issued Jul. 19, 2016 to Higbee et al., 483 pgs. (PGR Ex 1003).
Declaration of Kurt Wescoe, 25 pgs. (PGR Ex 1008).
Albrecht, K., "Mastering Spam: A Multifaceted Approach with the Spamato Spam Filter System," Ph.D. Thesis, Swiss Federal Institute of Technology Zurich, 2006, 143 pgs. (PGR Ex 1009).
Burri, N., "Spamato: A Collaborative Spam Filter System," Diploma Thesis, Swiss Federal Institute of Technology Zurich, 2004, 44 pgs. (PGR Ex 1010).
Schlacter, S., "Spamato Reloaded: Trust, Authentication and More in a Collaborative Spam Filter System," Master's Thesis, Swiss Federal Institute of Technology Zurich, 2004, 43 pgs. (PGR Ex 1011).
Albrecht et al., "Spamato—An Extendable Spam Filter System," 2nd Conference on Email and Anti-Spam (CEAS), Stanford University, Palo Alto, California, Jul. 2005, 8 pgs. (PGR Ex 1012).
Declaration of Ralph Massaro, 10 pgs. (PGR Ex 1014).
"Leading Computer Science University Takes Multi-Pronged Approach to Combat Phishing; Deploys Wombat Security's Highly Effective Suite of Training and Filtering Products," Mar. 10, 2011, available at https://www.wombatsecurity.com/press-releases/leading-computer-science-university-takes-multi-pronged-approach-combat-phishing, 2 pgs. (PGR Ex 1015).
Jan. 2010 License Agreement between Wombat Security Technologies, Inc. and Carnegie Mellon University (CMU) for Wombat's PhishPatrol Software, 4 pgs. (PGR Ex 1016).
Jan. 2010 Services Agreement between Wombat Security Technologies, Inc. and CMU for Wombat's PhishGuru service, 3 pgs. (PGR Ex 1017).
Jan. 2010 License Agreement between Wombat Security Technologies, Inc. and CMU for Wombat's Anti-Phishing Training Games, 2 pgs. (PGR Ex 1018).
Letter from Ralph Massaro of Wombat Security Technologies, Inc. To Maryanne Blair of Carnegie Mellon University (CMU) dated Nov. 28, 2011, 1 pg. (PGR Ex 1019).
Standard Purchase Order from CMU to Wombat Security Technologies, Inc. dated Dec. 6, 2011, 1 pg. (PGR Ex 1020).
Invoice from Wombat Security Technologies, Inc. To CMU dated Nov. 28, 2011, 1 pg. (PGR Ex 1021).
Nov. 30, 2012 "End User License Agreement" between Wombat Security Technologies, Inc. and Carnegie Mellon University (CMU), 6 pgs. (PGR Ex 1022).
"A Multi-Pronged Approach to Combat Phishing," Wombat Security Technology, Mar. 2011, 5 pgs. (PGR Ex 1023).
Excerpts from Microsoft Computer Dictionary, 5th ed., Microsoft Press, 2002, 5 pgs. (PGR Ex 1024).
Excerpts from Webster's New World Computer Dictionary, 10th ed., Wiley Publishing, Inc., 2003, 5 pgs. (PGR Ex 1025).
Excerpts from Merriam Webster's Collegiate Dictionary, 10th ed., 1996, 4 pgs. (PGR Ex 1026).
Excerpts from the American Heritage Dictionary, 2nd College Ed., Houghton Mifflin Co., 1985, 4 pgs. (PGR Ex 1027).
"PhishGuru Phishing Attack Simulation Service," Wombat Security Technologies, May 2012, 2 pgs. (PGR Ex 1028).
"An Empirical Evaluation of PhishGuruTM Embedded Training," Wombat Security Technologies, Apr. 2009, 12 pgs. (PGR Ex 1029).
"PhishGuru: Operations Manual," Wombat Security Technology, Version 4.0, Aug. 30, 2010, 3 pgs. (PGR Ex 1030).
"PhishPatrol—A Purpose-built Filter to Catch Those Crafty Spear Phishing Emails That Make It Past Other Email Security," Wombat Security Technologies, Apr. 2012, 4 pgs. (PGR Ex 1031).
Email string from Jun. 2011 involving employees of Wombat, 5 pgs. (PGR Ex 1032).
"PhishPatrolLib" code, 13 pgs. (PGR Ex 1033).
"PhishPatrol SpamAssassin Plug-In; Operations Manual," Wombat Security Technology, May 2011, 5 pgs. (PGR Ex 1034).
"Anti-Phishing Phyllis Training Game" Product Sheet from Wombat Security Technologies, 2011, 1 pg. (PGR Ex 1035).
Anti-Phishing Phyllis Instructions from Wombat Security Technology, 2010, 4 pgs. (PGR Ex 1036).
"PhishGuru Best Practices," Wombat Security Technologies, 2012, 5 pgs. (PGR Ex 1037).
Comparison of Claim 11 to Claim 1 created using Litera Change Pro, 5 pgs. (PGR Ex 1038).
Comparison of Claim 21 to Claim 1 created using Litera Change Pro, 4 pgs. (PGR Ex 1039).
Review of PhishGuru from PCMag, dated May 25, 2012, available at www.pcmag.com/article2/0,2817,2404750,00.asp and uk.pcmag.com/phishguru/18920/review/phishguru, with the images from the article from www.pcmag.com/article2/0,2817,2404750,00.asp, 21 pgs. (PGR Ex 1040).
Wombat Security Technologies, Inc.'S First Supplemental Invalidity Contentions, Civil Action No. 16-403-LPS-CJB, in the United States District Court for the District of Delaware, Mar. 10, 2017, 13 pages.
Exhibit B—Obviousness Claim Chart for U.S. Pat. No. 9,398,038 (Doc No. 300566670 v2), date stamp Mar. 10, 2017, 81 pages.
Wombat Security Technologies, Inc.'S Second Supplemental Invalidity Contentions, Apr. 7, 2017, Civil Action No. 16-403-LPS-CJB, 21 pgs.
Exhibit B—Obviousness Claim Chart for U.S. Pat. No. 9,398,038, date stamp Apr. 7, 2017, Civil Action No. 16-403-LPS-CJB, 81 pgs.
"IronPort Plug-in for Outlook," version 1.8, Administrator Guide, IronPort Systems, Inc., 2007, 16 pages.
R. Dodge, et al., "Phishing Awareness Exercises," Proc. 15th Colloquium for Information Systems Security Education, Fairborn, OH, Jun. 13-15, 2011, 6 pages.
Chris Porter, "Email Security with Cisco IronPort," Cisco Press, 2012, Chapters 1, 3, 8 and 11, 163 pages.
"Cisco IronPort Email Security Plug-in 7.3 Administrator Guide," Cisco Systems, Inc., May 1, 2013, 111 pages.
Non-Final Rejection dated Feb. 25, 2015 in U.S. Appl. No. 13/763,538.
Non-Final Rejection dated Mar. 26, 2014 in U.S. Appl. No. 13/763,538.
Final Rejection dated Sep. 23, 2014 in U.S. Appl. No. 13/763,538.
Non-Final Rejection dated Jul. 1, 2013 in U.S. Appl. No. 13/785,252.
Final Rejection dated Oct. 29, 2015 in U.S. Appl. No. 13/918,702.
Non-Final Rejection dated Feb. 11, 2015 in U.S. Appl. No. 13/918,702.
Non-Final Rejection dated Jul. 16, 2015 in U.S. Appl. No. 13/958,480.
Non-Final Rejection dated Apr. 24, 2015 in U.S. Appl. No. 14/620,245.
Final Rejection dated Oct. 20, 2015 in U.S. Appl. No. 14/620,245.
Advisory Action dated Nov. 14, 2014 in U.S. Appl. No. 13/763,538.
Non-Final Rejection dated May 27, 2016 in U.S. Appl. No. 15/138,188.
Non-Final Rejection dated May 5, 2016 in U.S. Appl. No. 15/418,709.
Non-Final Rejection dated Mar. 7, 2017 in U.S. Appl. No. 14/986,515.
Decision Denying Institution of Post-Grant Review of U.S. Pat. No. 9,398,038 in PGR2017-00009, entered Jun. 8, 2017, 4 pgs.
Patent Owner's Preliminary Response in PGR2017-00009, filed Apr. 6, 2017, 69 pgs.

(56) References Cited

OTHER PUBLICATIONS

Declaration of Dr. Stuart Stubblebine in PGR2017-00009, filed Apr. 6, 2017, Ex. 2001, 43 pgs.
Webster's New World Computer Dictionary, 10th edition, 2003, in PGR2017-00009, filed Apr. 6, 2017, Ex. 2008, 3 pgs.
NIST Glossary of Key Information Security Terms, NISTIR 7298, Rev. 2 (2013), in PGR2017-00009, filed Apr. 6, 2017, Ex. 2009, 222 pgs.
"Why Phish Should Not Be Treated as Spam" accessed Apr. 4, 2017, in PGR2017-00009, filed Apr. 6, 2017, Ex. 2010, 3 pgs.
Expert Declaration of Dr. Aviel Rubin (Ex. 1002).
Declaration of Mark G. Knedeisen (Ex. 1003).
First Amended Complaint for Patent Infringement, *PhishMe, Inc.* v. *Wombat Security Technologies, Inc.*, Case No. 16-403-LPS-CJB, D. Del., Jul. 19, 2016 (Ex. 1004).
Fahmida Y. Rashid, "PhishGuru," PC Mag, www.pcmag.com/article2/0,2817,2404750,00.asp, May 25, 2012 (Ex. 1007).
C. Porter, Email Security with Cisco IronPort, Cisco Press, 2012 (Ex. 1008).
"Cisco IronPort Email Security Plug-in 7.1 Administrator Guide," Cisco Systems, Inc., Dec. 6, 2010 (Ex. 1009).
K. Albrecht, Mastering Spam: a Multifaceted Approach with the Spamato Spam Filter System, Doctoral Thesis, Swiss Federal Institute of Technology (ETH) Zurich, 2006 (Ex. 1010).
Ex parte Schulhauser, Appeal 2013-007847 (PTAB Apr. 28, 2016) (Ex. 1011).
PhishMe and Wombat's Joint Claim Construction Chart, *PhishMe, Inc.* v. *Wombat Security Technologies, Inc.*, Case No. 16-403-LPS-CJB (D. Del.), Apr. 21, 2017 (without exhibits) (Ex. 1012).
Declaration of Steve Hicks (Ex. 1013).
Comparison: Claim 11 to Claim 1 of U.S. Pat. No. 9,398,038 (Ex. 1015).
Comparison: Claim 21 to Claim 1 of U.S. Pat. No. 9,398,038 (Ex. 1016).
Declaration of Alan Himler (Ex. 1019).
Declaration of Elizabeth Whittington (Ex. 1020).
P. Kumaraguru et al., "Lessons From a Real World Evaluation of Anti-Phishing Training," eCrime Researchers Summit, Oct. 15-16, 2008 (Ex. 1021).
P. Kumaraguru, "PhishGuru: A System for Educating Users about Semantic Attacks," Ph.D. Thesis, Carnegie Mellon University, Apr. 14, 2009 (Ex. 1022).
IPR2017-01813 Petition for Inter Partes Review of U.S. Pat. No. 9,398,038.
Declaration of Aviel Rubin, Ph.D. (Ex. 1010).
Petition for Post-Grant Review of U.S. Pat. No. 9,674,221, PGR2017-00050, filed Sep. 11, 2017.
Complaint for Patent Infringement, *PhishMe Inc.* v. *Wombat Security Technologies, Inc.*, Jun. 16, 2017 (Ex. 1002).
Complaint for Patent Infringement, *PhishMe Inc.* v. *Wombat Security Technologies, Inc.*, Jun. 1, 2016 (Ex. 1003).
First Amended Complaint for Patent Infringement, *PhishMe Inc.* v. *Wombat Security Technologies, Inc.*, Jul. 19, 2016 (Ex. 1004).
Second Amended Complaint for Patent Infringement, *PhishMe Inc.* v. *Wombat Security Technologies, Inc.*, Sep. 6, 2016 (Ex. 1005).
Consolidation Order, *PhishMe Inc.* v. *Wombat Security Technologies, Inc.*, Case No. 16-403-LPS-CJB and 17-769-LPSCJB, Jun. 28, 2017 (Ex. 1006).
Decision Denying Institution of Post-Grant Review, PGR2017-00009, U.S. Pat. No. 9,398,038, Paper 7, Jun. 8, (Ex. 1007).
Petitioner's Request for Rehearing, PGR2017-00009, U.S. Pat. No. 9,398,038, Paper 8, Jun. 20, 2017 (Ex. 1008).
Decision Denying Request for Rehearing, PGR2017-00009, U.S. Pat. No. 9,398,038, Paper 9, Jul. 20, 2017 (Ex. 1009).
U.S. Appl. No. 13/765,538, filed Feb. 8, 2013 (Ex. 1011).
U.S. Appl. No. 13/785,252, filed Mar. 5, 2013 (Ex. 1012).
Redline comparison between U.S. Appl. No. 13/785,252 and U.S. Appl. No. 13/765,538 (Ex. 1013).
Cisco IronPort Email Security Plug-in 7.1 Administrator Guide, Cisco Systems, Inc., Dec. 6, 2010 (Ex. 1014).
Keno Albrecht, "Mastering Spam: A Multifaceted Approach with the Spamato Spam Filter System," Swiss Federal Institute of Technology Zurich, 2006 (Ex. 1015).
Fahmida Y. Rashid, "PhishGuru," PC Mag, www.pcmag.com/article2/0,2817,2404750,00.asp, May 25, 2012 (Ex. 1016).
Declaration of Kurt Wescoe (Ex. 1017).
Declaration of Ralph Massaro (Ex. 1018).
"Leading Computer Science University Takes Multi-Pronged Approach to Combat Phishing; Deploys Wombat Security's Highly Effective Suite of Training and Filtering Products," Mar. 10, 2011 (Ex. 1019).
"A Multi-Pronged Approach to Combat Phishing," Wombat Security Technology, Mar. 2011 (Ex. 1020).
P. Kumaraguru et al., "Lessons From a Real World Evaluation of Anti-Phishing Training," eCrime Researchers Summit, Oct. 15-16, 2008 (Ex. 1022).
P. Kumaraguru, "PhishGuru: A System for Educating Users about Semantic Attacks," Ph.D. Thesis, Carnegie Mellon University, Apr. 14, 2009 (Ex. 1023).
Declaration of Alan Himler (Ex. 1024).
Declaration of Elizabeth Whittington (Ex. 1025).
Ex parte Schulhauser, Appeal 2013-007847 (PTAB Apr. 28, 2016) (Ex. 1026).
Redline comparison of claim 11 of U.S. Pat. No. 9,591,017 to claim 1 of U.S. Pat. No. 9,591,017 (Ex. 1027).
Declaration of Steve Hicks (Ex. 1028).
U.S. Appl. No. 13/763,486, filed Feb. 8, 2013 (Ex. 1030).
Redline comparison of claim 21 of U.S. Pat. No. 9,591,017 to claim 1 of U.S. Pat. No. 9,591,017 (Ex. 1032).
Petition for Post-Grant Review of U.S. Pat. No. 9,591,017, PGR2017-00047, filed Aug. 23, 2017.

\* cited by examiner

| From | Subject | Report Phishing |
|---|---|---|
| Text | Meet me in my office | ☐ |
| john@suspicious.com | Suspicious | ☑ |
| hr@company.com | Upcoming Staff Wellness Programs | ☐ |

510

1300

Rule Creator

Name: _____ 1310

Description: _____

Severity: [High ▽ / Medium / Low] — 1320

Tags: _____

Active: ☑    Match Against: Text [Against Attachment ▽ / Against Email] 1340

Share Anonymously? ☑

Content: _____ 1330

Rule Creator

Name: ⬚ ─1310

Description: ⬚

Severity: [High ▽] / Medium / Low  ─1320

Tags: ⬚

Active: ☑   Match Against: Text [Against Attachment ▽] / [Against Email]  ─1340

Share Anonymously? ☑

Content:
```
strings:
    $subject = "Suspicious Email"
    $from = "test@suspicious.com" nocase condition:
    $subject and $from
```
─1430

FIG. 14

| # | From | Subject | Last Received | Last Reported | Credibility Score ⟵1510 | Match Severity | Counts ⟵1530 | Rule Matches ⟵1520 |
|---|---|---|---|---|---|---|---|---|
| 1 | x@phish.com | Phishing | 12/1/2015 | 12/1/2015 | 23 | 3 | 0 | 7,13,18 |
| 2 | x@phish.com | Download ThiS! | 10/4/2015 | 10/30/2015 | 17 | 2 | 1 | 7,18,24 |
| 1 | hr@comp.com | HR Report | 10/29/2015 | 11/5/2015 | 937 | 1 | 0 | 1 |

Recipe Creation

Name: [1610]

Description: [1620]

Category*
| Non-Malicious ▽ |
| Spam |
| Crimeware |
| Advanced Threats |

Status*
| Active ▽ |
| Inactive |
1630

Rule Matches [New Rule]
☐ Rule 1
☐ Rule 2
☐ Rule 3
1650

Actions:

○ No response will be sent

◉ Send a response to the reporter Create Response

[Thank you for Reporting ▽]

Tags: [1640]

Recipe Creation

Name: ☐ ←1610

Description: ☐
1620

Category*  Status*

| Non-Malicious ▽ | Active ▽ |
| Spam | Inactive |
| Crimeware | ↖1630 |
| Advanced Threats | |

Rule Matches [New Rule]

☑ Rule 1  ⟵1750
☐ Rule 2
☑ Rule 3

Actions:

○ No response will be sent

◉ Send a response to the reporter Create Response

[Thank you for Reporting ▽]

1640
Tags: ☐

FIG. 17

SUSPICIOUS MESSAGE PROCESSING AND INCIDENT RESPONSE

CROSS-REFERENCE TO RELATED APPLICATIONS

This application is a continuation of application Ser. No. 14/986,515, filed Dec. 31, 2015, which claims the benefit of U.S. Provisional Application No. 62/145,778, filed Apr. 10, 2015, the entire contents of each of which are incorporated herein by reference.

FIELD OF THE INVENTION

The present invention relates to methods, network devices, and machine-readable media for an integrated environment for automated processing of reports of suspicious messages, and furthermore, to a network for distributing information about detected phishing attacks.

BACKGROUND OF THE INVENTION

In a phishing attack, an individual (e.g., a person, an employee of a company, a user of a computing device) receives a message, commonly in the form of an email or other electronic message or communication, directing the individual to perform an action, such as opening a message attachment or following (e.g., using a cursor controlled device or touch screen) an embedded link. If such message were from a trusted source (e.g., co-worker, bank, utility company or other well-known and trusted entity), such action might carry little risk. Nevertheless, in a phishing attack, such message is from an attacker (e.g., an individual using a computing device to perform a malicious act on another computer device user) disguised as a trusted source, and an unsuspecting individual, for example, opening an attachment to view a "friend's photograph" might in fact install spyware, a virus, and/or other malware (e.g., malicious computer software) on the user's computer. Similarly, an unsuspecting individual directed to a webpage made to look like an official banking webpage might be deceived into submitting a username, password, bank account number, etc. to an attacker.

Software as a Service (SaaS) solutions for sending simulated phishing messages are known, such as that described in U.S. Pat. No. 9,053,326. Such solutions for user training and education have been proven to reduce the susceptibility of users to phishing attacks. Some solutions provide the user with a user interface as a means for reporting suspected phishing attacks, such as that described in U.S. patent application Ser. No. 13/763,538. Provided with the means to report, due to the difficulty of discerning attacks from legitimate messages, users may report actual phishing attacks, as well as legitimate messages. False positive reports sent to network security personnel are distracting and time consuming to process and respond to.

Thus, what is needed is a system for allowing network security personnel to quickly discern malicious messages from a large volume of reported threats.

BRIEF DESCRIPTION OF THE DRAWINGS

FIG. 13 illustrates an example rule creation.

FIG. 14 illustrates an example rule creation from a reported message.

FIG. 15 illustrates an example console module text view.

FIG. 16 illustrates an example recipe creation.

FIG. 17 illustrates an example recipe creation from a reported message.

DETAILED DESCRIPTION

In the following description of embodiments, reference is made to the accompanying drawings which form a part hereof, and in which it is shown by way of illustration specific embodiments of claimed subject matter. It is to be understood that other embodiments may be used and changes or alterations, such as structural changes, may be made. All embodiments, changes or alterations are not departures from scope with respect to intended claimed subject matter. While the steps below may be presented in a certain order, in some cases the ordering may be changed so that certain inputs are provided at different times or in a different order without changing the function of the systems and methods described. The procedures described herein could also be executed in different orders. As a non-limiting example, the rules sharing procedure could be performed before or after sending simulated phishing messages. Additionally, various computations that are described below, such as those within the user reputation modules, need not be performed in the order disclosed and other embodiments using alternative orderings of the computations could be readily implemented. In addition to being reordered, the computations could also be decomposed into sub-computations with the same results.

Overview of System Processes

The present invention addresses shortcomings of previous attempts to manage simulated phishing campaigns and counter phishing attacks. As used herein, simulated phishing attacks, as well as actual phishing attacks, may be embodied in the form of a message. As non-limiting examples, the message may be in the form of an electronic mail (email) message, a messaging service such as Short Message Service (SMS) or Multimedia Messaging Service (MMS), instant messaging, webpages, pop-up windows, blogs, Internet fora, social network applications, voice over internet protocol (VOIP) applications, video or voice messaging, or any other proprietary or open source means of electronically transferring content between computing devices.

Figure 1:
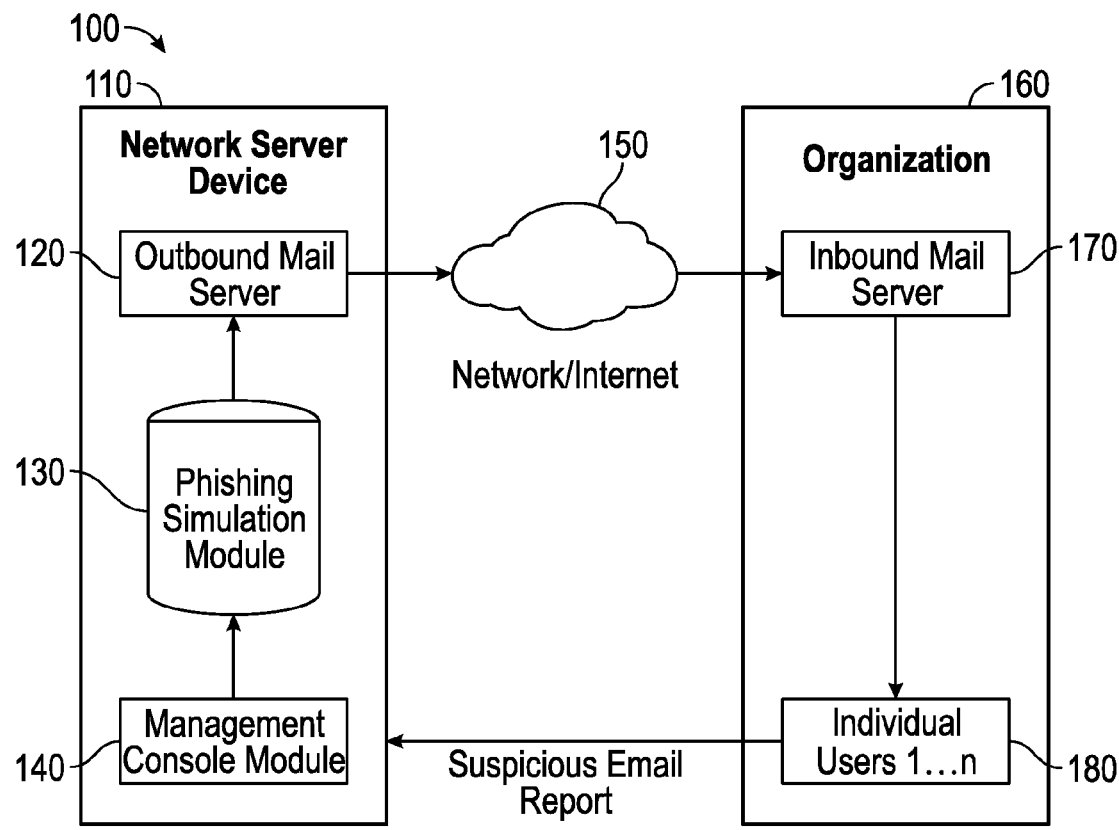
FIG. 1 illustrates an example system for simulated phishing message management according to one embodiment.
Figure 2:
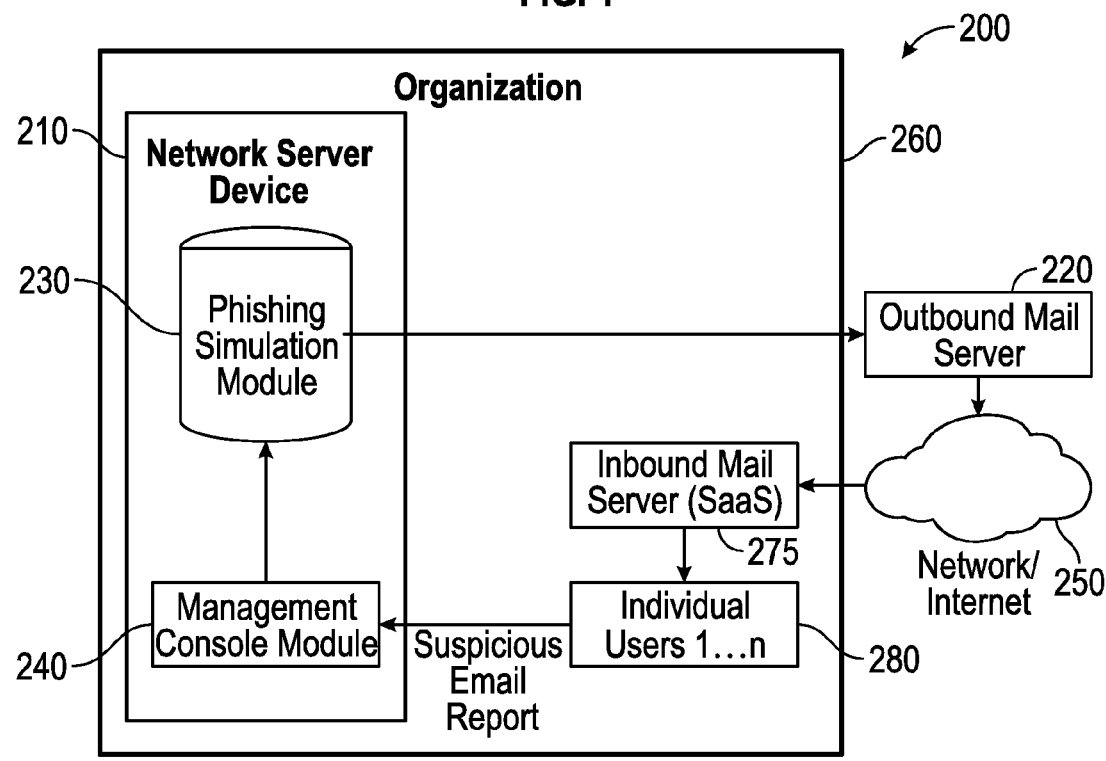
FIG. 2 illustrates another example system for simulated phishing message management according to another embodiment.
Figure 3:
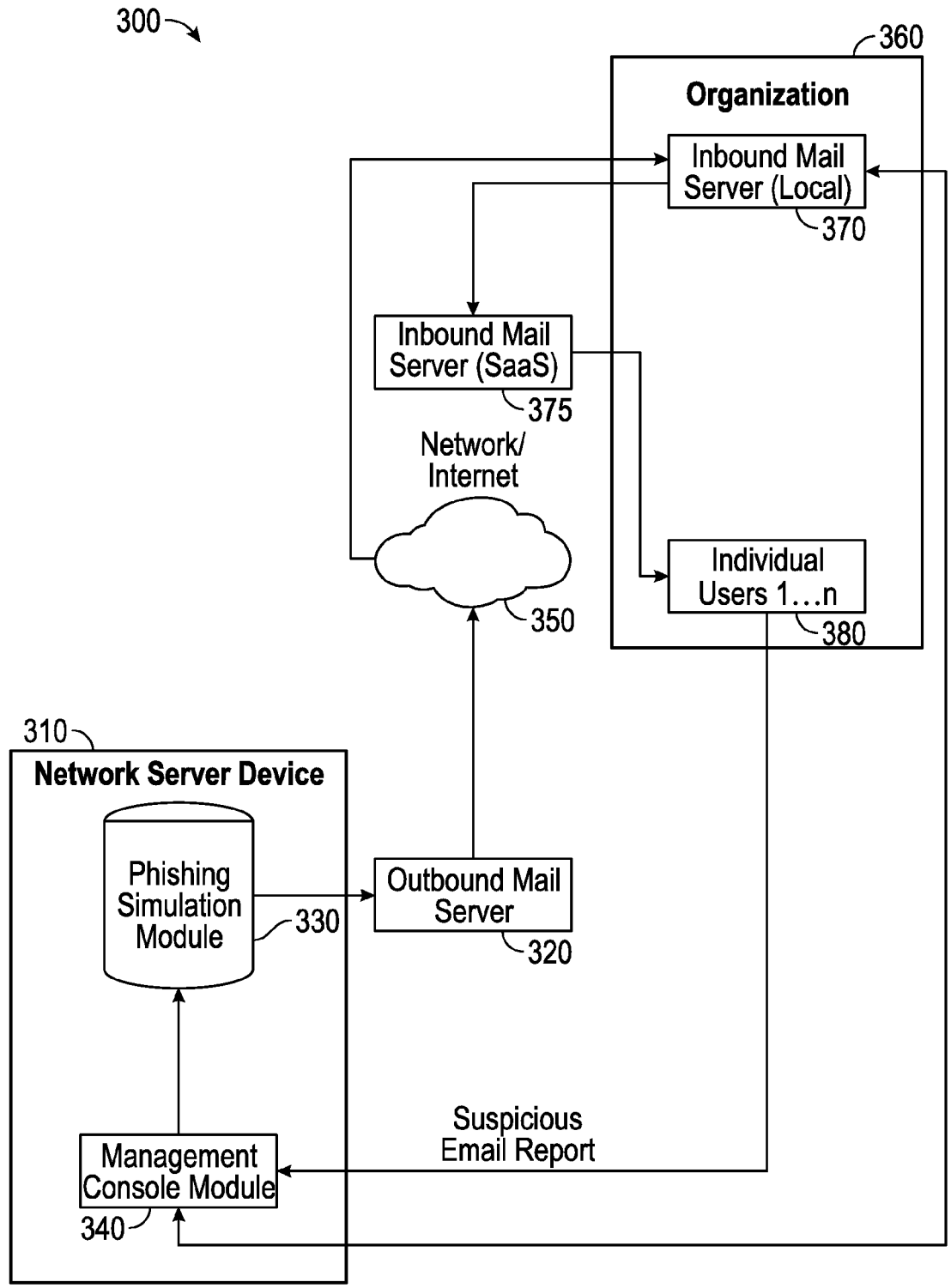
FIG. 3 illustrates another example system for simulated phishing message management according to another embodiment.

As will be described in further detail below, the present invention provides a system and method for triaging reported malicious messages including a management console and a phishing simulation module. Example logical diagrams of such a system are shown in FIGS. 1-3, where like referenced numbers correspond to similar elements. Turning first to FIG. 1, a system 100 is illustrated as having a network server device 110 with access to an outbound mail server 120 that is in communication through a network 150 with an organization 160 such that messages can be sent from the network server device 110 to individual users 180 at the organization 160. In some embodiments, the organization 160 operates an inbound mail server 170 for receiving messages from external sources. The network server device 110 may also contain a phishing simulation module 130 for generating a simulated phishing campaign, as well as a management console module 140 to manage simulated phishing campaigns and incoming reported messages. Alternative configurations are illustrated in FIGS. 2 and 3. The inbound mail server 170 may be configured to provide messages directly to individual users 180, or may be configured to forward messages to a network message service 275, such as Gmail™ or Outlook™. The network message service 275 may allow access to the forwarded messages by any type of client device, such as handheld wireless or other type of mobile devices, such as those running Apple™ iOS™ or Android™ operating systems, as well as desktop systems. While certain components are illustrated as being a part of other components, such as the outbound mail server 120 being a part of the network server device 110 the various components described could be physically or logically located separately.

As illustrated in FIG. 2, the network server device 210 can be part of or contained within the organization 260. This allows for internal simulated phishing campaigns to be launched from a phishing simulation module 230. Alternatively, as shown in FIG. 3, the system can be external to the organization 360. In this and other embodiments, there can be a connection to an internal or external database containing information regarding confirmed malicious messages. This can be a connection to another organization with which information is shared, or a database to which a single or multiple organizations forward information and can receive information to develop recipes or determine if a reported message has already been identified as a malicious message. In any of the above examples, the network server device may generate a simulated phishing message in a phishing simulation module 330 to send to any number of individuals in the organization a simulated phishing attack message.

As non-limiting examples, the systems and methods described herein can be used to raise the acuity of the individual in identifying phishing attack messages and provide a means for identifying and reporting those messages so that remedial action can be taken with reduced time between arrival of the attack message and the remedial action. As described below, this can be accomplished in part by providing a console at which reports of suspicious messages can be efficiently reviewed. Each user reporting a phishing attack message may be given a reputation score. The reputation score may be adjusted based on correctly or incorrectly reporting a message as a phishing attack message. A correct report may be indicated when a user reports a message which was originally generated by the phishing simulation module in the system.

For messages that are not simulated phishing messages, the message or the source of the message can be assigned a credibility score similar to the reputation score of users of the system. Message content of similar messages, user reputation scores, and sender credibility scores may then be used to aid an administrator in triaging incoming reported messages.

Generation of a Simulated Phishing Message

Figure 4:
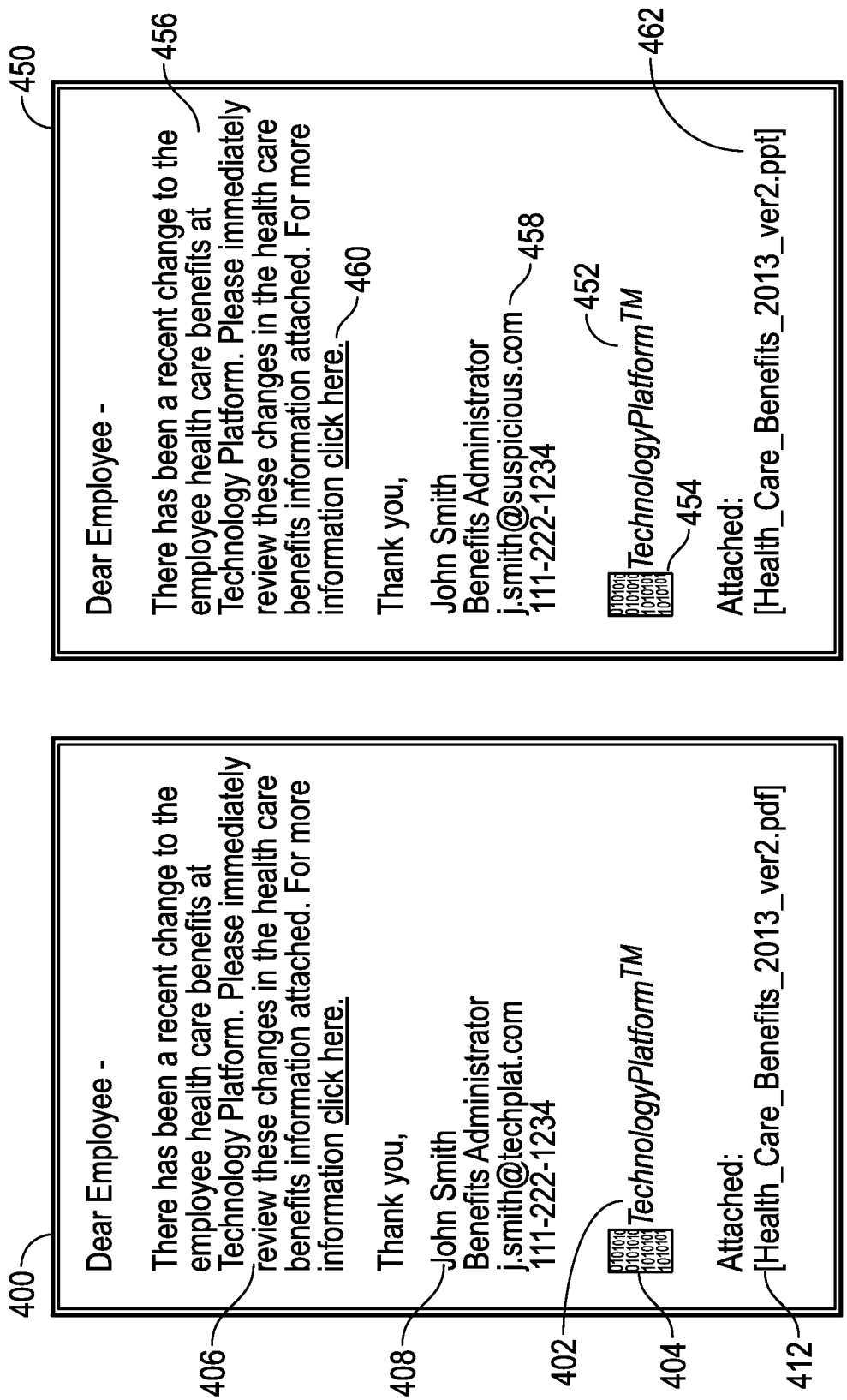
FIG. 4 illustrates an example trusted message and an example phishing attack message.

FIG. 4 depicts a comparison of a trusted message 400 and a phishing attack message 450 (whether simulated or real). Whereas the trusted message 400 contains actual information necessary to a recipient, e.g. an employee, the phishing attack message is disguised to look as if it were from a trusted source. The phishing attack message 450 may have similar logos 452, artwork 454, and text 456 as a trusted message 400 from an organization would (i.e logo 402, artwork 404, and text 406). A phishing attack message 450 may even appear to have a valid e-mail address 458 associated with the organization, as in email 408 of the trusted message 400. The links 460 and attachments 462 in the phishing attack message 450, however, may contain malicious code or attempt to gain secure information, such as passwords, from the user. A simulated phishing attack message may be generated in a phishing simulation module. The phishing simulation module may provide a template message that can contain placeholders for, e.g., an employee name, a company name, a human resource representative, a human resource job title, a human resource email address, a human resource phone number, a company logo and a name of an attached file. FIG. 4 further depicts a simulated phishing attack constructed from the template message in the phishing simulation module. In the message depicted in FIG. 4, the recipient of the message is Employee who works at Technology Platform. The message is disguised to appear as if it were actually sent from John Smith, although it was, in fact, sent from a network server device conducting a simulated phishing attack. John Smith's job title, email address and phone number are included so that the message appears to be a legitimate email sent from Smith. The company logo 454 also helps to disguise the email as a legitimate email from Smith. The attachment name 462 is a fictitious name "Health_Care_Benefits_2013_ver2.ppt" made to resemble the name of an attachment 412 that the recipient (i.e., Employee) might expect to receive with such email.

The simulated attack message 450 may be personalized and/or targeted with individual-specific and company-specific information. The individual-specific information might include the recipient name, Employee, and the company-specific information might include the sender name, sender job title, sender email address, sender phone number, company name, and company logo. Company-specific information may be duplicated across different recipients. Company-specific information might also include a company address, company project names, company fonts, company font colors, company font size, etc.

The attachment name could be tailored to the recipient, a company, or could be a generic name. It would make sense to use a company-specific attachment name if, for example, a company uses a specific naming convention for file attachments.

The phishing simulation module may also store templates that may contain no placeholders. Templates without placeholders may be desirable so that every individual receives exactly the same phishing attack(s), permitting a uniform or standardized method of evaluating individuals. Templates without placeholders may be desirable in instances where the performance of an individual and/or an organization is compared with a benchmark.

Another technique to standardize simulated phishing attacks is to use a common attack vector across individuals, where an attack vector refers to the means of delivering one or more messages of a simulated phishing attack. Example attack vectors include email, text messages, and instant messaging.

The phishing simulation module may embed additional information into the simulated phishing attack message, so that the message may be identified as a simulated attack. For example, the simulated phishing message can have identifying characteristic data that indicates that the message is a simulated attack. As non-limiting examples, the identifying characteristic can be in the body of the message, associated with the message, or in metadata for the message, such as contained in a message header field. Header fields can be lines beginning with a field name, followed by a colon (":"), followed by a field body, and terminated by a carriage-return, line feed (CRLF). The identifying characteristic could be a sender identifier of the message, a recipient identifier of the message, a subject of the message, a time of transmission of the message, and a header of the message. The identifying characteristic can include one or more of a sender identifier of the message, a recipient identifier of the message, a subject of the message, a time of transmission of the message, and a header of the message.

Furthermore, the identifying characteristic may be encrypted and/or otherwise encoded, such that only the phishing simulation module is capable of generating a simulated phishing attack message that is recognized by a network server device.

An example identifying characteristic may be a header having encoded and encrypted data, which may be in the form of:

X-PhishMessageTracking: [Encoded (Encrypted data)]==

As in the above example, the header may have the data structure:

http://phishreporter.phishmessage.com/3918d3df-94ea-459f-af17-084474c0a801/email?expr=hh:mm:ss:UTC, where "3918d3df-94ea-459f-af17-084474c0a801" is an example identifier and a value associated with the variable name "expr" in a name-value pair (NVP) indicates an expiration time.

In some embodiments, the header may contain additional information, and have the data structure:

http://phishreporter.phishmessage.com/3918d3df-94ea-459f-af17-084474c0a801/
email?c1=<integer>&c2=<integer>&v=<version>&b= <build>&t=<token>&s=<client code>&a=armor&expr=hh: mm:ss:UTC, where each NVP indicates a variable name and a variable value separated by an equal sign, additional NVPs separated by ampersands. Any or all of these example fields could be modified or removed and other fields could be added.

The header can include a unique or a substantially unique identifier generated by the system for tracking purposes. In some embodiments, the identifier can be an alphanumeric code. The header may also include, as part of identifier information or separately, an identification of the user for whom the simulated phishing message was generated. This may provide attribution back to the user who reported the suspicious message and support reputation management, as described in more detail below.

An example header may be encoded or encrypted, as described in further detail below, and appear as:

X-PhishMessageTracking:
WwrKPZ5XSdJ+IZyIVO6+
NDk8Pnz8wBiGyJzYZmOATtsvyrdrDmVXhJIBw/
E7azGpmu1BF q4u5ItGQB7E4SgryqcZHc2UzP+
t2VcNmcHA3nnCveQRjIeLD35BxJDTN2+
Lcwty1cXRsVKI
v4eeAOFOLotiMbq6u85fyFntLIbO2rI79Ejxpg/
dJJJBJBJcXGKnacUvPsWu7lmIlkW73T6vcvJg 2grPt+
1HoPh0sitn82X8u/gW4617zoqD+WsOk/
BP1Pb3eJQFYMTWK2gjLvV7CSsoPX9kZ/Rx
TjXRHKWm29BVwzTeY3Hx6/7XTJFdHrZaPcXMjq/
ROgFJPOtSm2zA+g==

Reporting of Suspicious Messages

The system can include a method for a user, having received any arbitrary message, to report the message as suspicious. As non-limiting examples, a message may be considered to be suspicious if some aspect of the message causes the recipient to suspect that it is being sent for a malicious purpose or from an unfamiliar source or contains other indicators that the message is not from who it represents itself to be from. Non-limiting examples of suspicious purposes can be to solicit access credentials or other types of personal or confidential information, or to induce the recipient to execute malicious software provided by the message. The system can be configured to allow reporting of messages generated according to the simulated phishing methods described above, or sent from another source.

When a message is received on a computing device of an individual, the user may report the message as a possible phishing attack. When reported, a network server device then receives a notification indicating that the one or more users has reported the message as a possible phishing attack. Such notification may be received via email (e.g., the suspicious email forwarded to a network administrator of network server device) or by an out-of-band means, using any protocol sufficient to transmit the notification. In one embodiment, a plug-in built into an email client (e.g., Microsoft™, Outlook™ IBM™ Lotus Notes™, etc.) or a web-based email client (Gmail™ from Google™, Yahoo!™ Mail™ from Yahoo!™) may provide users of the mail client with a toolbar and/or graphical user interface element that, when selected or activated, automatically reports an email as a suspicious message (and more specifically, as a possible phishing attack) to the network server device (or administrator thereof) or a network device other than the network server device (e.g., an email security analysis engine). Alternatively, the reporting function can be a standalone program or function that allows a user to report a message. This can allow for drag and drop of messages from the program in which the message was received for reporting. The program can also execute in the background and enable other functionality, such as right-click functionality to enable a report functionality.

Figures 5A, 5B:
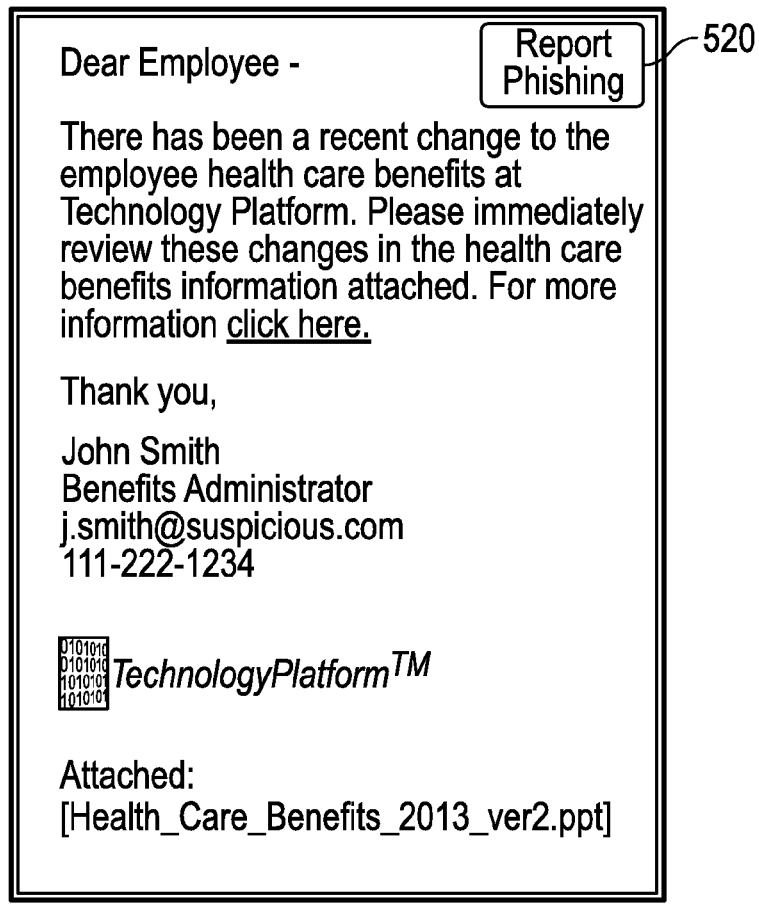
FIG. 5A illustrates a report button for reporting a phishing message from a message inbox view.
FIG. 5B illustrates another report button for reporting a phishing message on a message preview.

In any of the embodiments, a single graphical user interface action (e.g., one-click of a button, one-touch of a button) may be sufficient to trigger the notification to be sent to the network device. Examples of such a graphical reporting button are illustrated in FIGS. 5A and 5B. The graphical user interface can include a label to the effect of "Report Phishing" as a button 520, or may be presented as a contextual menu item 510. In some embodiments, a single click of a user-interface element may be sufficient to report a simulated phishing message generated by the system described herein. In such embodiments, identifying information relating to the reported message and/or the user who reported the message may be communicated to the network server device while the body of the message is not transmitted to the network server device. In further embodiments, when reporting a suspicious message not generated by the system, an additional confirmation dialog may be presented to the user before all of some the message is communicated to the network server device for further processing.

In the process of reporting, the reported message body and/or any associated headers or metadata may be included in its entirety, partially included, or omitted. The identifying characteristics of the suspicious message described above may be sent to the network device. The network server device may be notified that a message has been reported by one or more individuals as a possible phishing attack by means other than email, including a SMS message, a telephone call, an instant message (IM), etc.

In some embodiments, activating the report functionality causes the entire message to be forwarded from the client computing device to a pre-configured address at the network server or management console as an attachment. In other embodiments, less than all of the message is transmitted for processing, in some cases only header information and/or a subset of the message body or attachments. In some embodiments, the pre-configured address could be a distribution list. After being reported, the system at the client computing device can move the reported message to a "Deleted Items" or "Junk" folder, or apply a corresponding deleted or junk label, or take no action with respect to moving the message. Alternatively, or in addition, the system may be configured to store messages in an electronic data store at the network server device or other location accessible to the management console module without forwarding through a general-purpose email server or using simple mail transfer protocol (SMTP).

Alternatively, or in addition, a message may be set to be inaccessible to the reporting individual upon it being reported (or otherwise quarantined) and remain in such status until there is a resolution to the status of the message. If the message is determined not to be a phishing message, it is returned to a normal accessible status. If it is determined to be a phishing message, then the message can be deleted or moved into "Junk" folder or such action be taken.

The system can determine whether or not the message being reported is a simulated phishing message generated by the system. The overall process is to: 1) find a specified header key, 2) decode and/or decrypt the value for the header key, 3) if the decode and/or decrypt was successful, get a tracking URL encoded in the header, and 4) determine if the message is a known simulated phishing attack based on whether or not the decode and/or decrypt was successful. The determination of whether or not the message being reported is a simulated phishing message generated by the system can be performed at the client device where the message is received for access by a user, or at a remote device, such as the network server device, or at both devices. The steps of the determination may also be split between multiple devices, such as the client device and the remote device.

Figure 6:
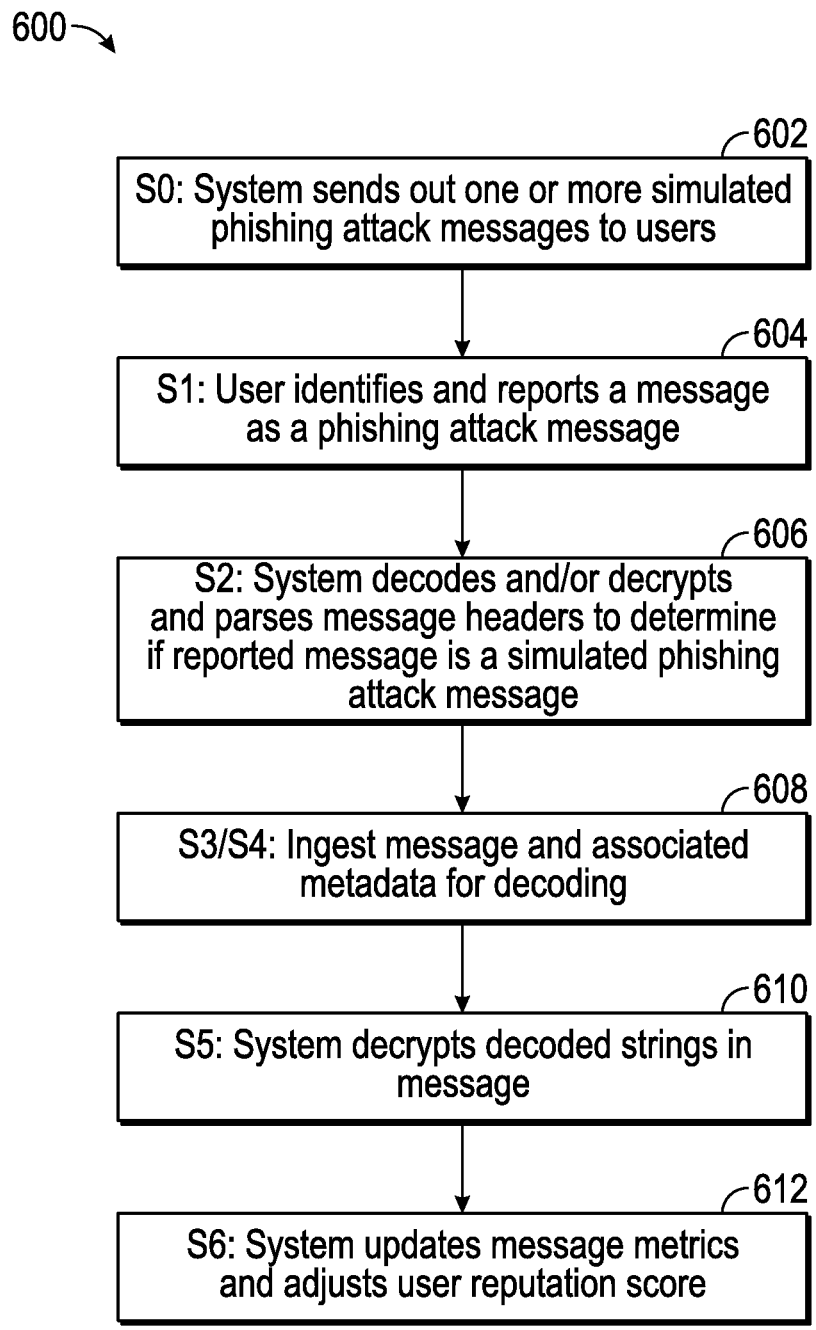
FIG. 6 illustrates an example system process for determining if a reported message was a simulated phishing attack and adjusting a reporter's reputation score accordingly.

An example process of simulating phishing messages and responding to suspicious messages, as described above, is illustrated in FIGS. 6 and 7. Turning first to FIG. 6, an example flow 600 for sending a simulated message is illustrated. In stage 602 (step S0), a phishing simulation module generates a message for a simulation/scenario. The message may be generated from a template, as well as contain an identifying characteristic, such as in a header. For example, the identifying characteristic may be X-PhishMessageTracking: header. The header may also be encrypted and/or encoded and may contain a tracking URL linking the message and the user to whom the message was sent to for a scenario. The message is then sent to a user. In stage 604 (step S1), the recipient of the message (e.g., the user) clicks on a reporter button. In stage 606 (step S2), code executing at the client device parses the message for the X-PhishMessageTracking header. In stage 608, if the header is found, the system ingests the encoded string associated with the header (step S3) and the string is decoded (step S4). In stage 610 (step S5), the system then attempts to decrypt the decoded string from stage 608. The header can be encrypted and/or decrypted using symmetric or asymmetric cryptographic techniques. If the header is encrypted using asymmetric cryptographic techniques, such as but not limited to Public Key Infrastructure (PKI), the header may be encrypted at the network server device using a public key and then decrypted at the client device using the corresponding private key. The system can be configured to generate multiple headers for multiple messages using the same public/private key pair or generate a unique public/private key pair corresponding to each message generated. In some cases, a single phishing campaign may be configured to use a single public/private key pair. The private keys may be distributed to the client devices either directly from the network server device or through an intermediary to which multiple client devices are communicating. Finally, in stage 612 (step S6), a user reputation score is updated using the tracking URL extracted from the simulated phishing attack message. For exemplary purposes, if the user correctly identifies the message as an attack message, the user's reputation score may be increased.

Figure 7:
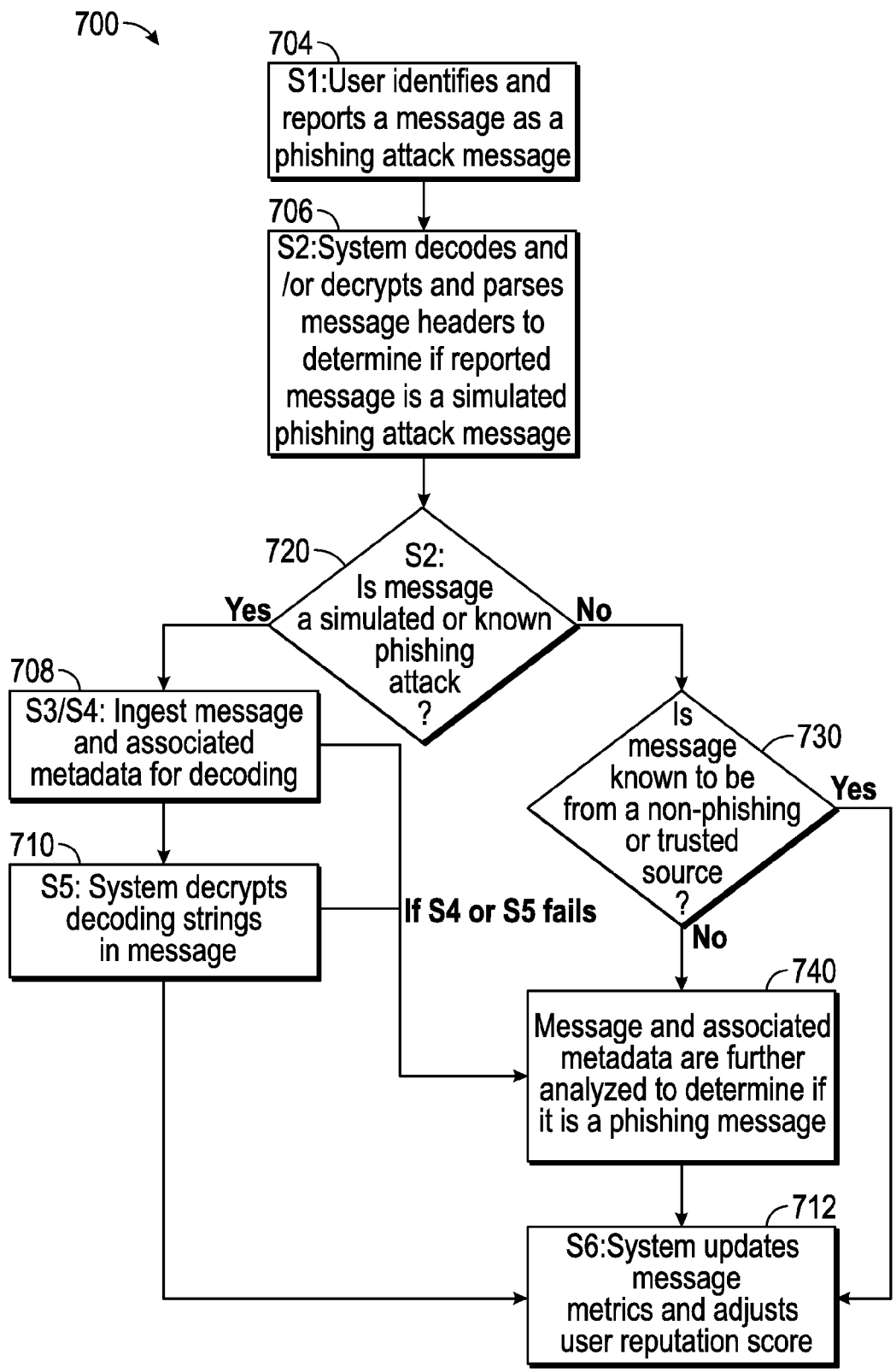
FIG. 7 illustrates an example system process for updating a reporter's reputation score where the reported message is not necessarily a simulated phishing attack.

As illustrated in flow 700 of FIG. 7, the system may also respond to messages other than simulated phishing attack messages. As in FIG. 6, the system may receive a message identified as a potential phishing attack in stage 704 (step S1) and proceed to stage 706 (step S2), where the message is decoded and/or decrypted. Unlike FIG. 6, after stage 706 (step S2), the flow 700 may proceed to stage 720, where the message is determined to be a simulated or known phishing attack. If the message is not a known phishing attack or simulated phishing attack message, the system treats the message as non-simulated suspicious message and processes accordingly by, e.g., forwarding it to a pre-configured address and proceeds to stage 730. Additionally, if the header data relating to an expiration time (expr=hh:mm:ss: UTC) has expired, then the message may also be treated as suspicious, continuing to stage 730. In those embodiments, as a non-limiting example, some of or all of the reported message may be forwarded to an address accessible in a mail server by any appropriate protocol, such as, but not limited to, Internet Message Access Protocol (IMAP), Post Office Protocol (POP), ActiveSync™, or Exchange™. The reported message address may be at an intermediate message store configured for collecting the reported messages. In stage 730, if the system determines that the message is not from a non-phishing or trusted source flow 700 proceeds to stage 740, otherwise flow 700 proceeds to stage 712. In a stage 740, the message and associated metadata are further analyzed to determine if the message is a phishing attack message.

Returning to the decision in stage 720, if, however, the message is a simulated or known phishing attack, flow 700 proceeds to stage 708, as in FIG. 6. As a redundant check, if the system is unable to determine metadata in stage 708 (step S4) or decode and/or decrypt the metadata in stage 710

(step S5), flow 700 also proceeds to stage 740. Otherwise, flow 700 proceeds to stage 712 (step S6), where the user reputation score is updated.

In some embodiments, code executing at the network server device can parse the header and make the determination as to whether or not the message being reported is a simulated phishing message generated by the system. In those embodiments, certain information may be first stripped from the message before forwarding for further analysis. In particular, identifying information such as the to: header field and domain name information may be removed.

As in FIG. 6, in stage 712 after decoding and decrypting, the system derives a tracking URL (step S6). The tracking URL could be in the form of "https://phishreporter.phishmessage.com/3918d3df-94ea-459f-af17-084474c0a801". Having successfully decoded and decrypted the string (the contents of which are a tracking URL in step S6), the system calls out to that URL to update metrics related to the simulated phishing message. As example metrics, tracking and identifying information from the string can be used to update a reputational score associated with the user reporting the message, as further described below.

Suspicious Message Received at Management Console Module

In some embodiments, the system may access the forwarded suspicious messages from an intermediate message store by any appropriate protocol, such as, but not limited to, Internet Message Access Protocol (IMAP), Post Office Protocol (POP), ActiveSync™, or Exchange™ and retrieve the messages from the reporter inbox. Using the method described above, it is previously determined whether the suspicious message is a system-generated simulated phishing message. If that check has not yet been performed, it can be performed at this time.

In one embodiment, reported messages are received at the network server. The reported messages are checked against rules stored in the system. The rules can be written for YARA or another tool that enables determining whether message or attachment data contains defined textual or binary patterns (e.g. regex parsing, etc). A module for managing the processing rules is described in more detail below. As a result of the parsing, information about the reported messages can be processed and presented in a console, or other administrative portal.

Console Module

The system can include a console module, which can also be referred to as a dashboard, portal, or by a similar label. The console module can display various administrator controls and options, as further described herein, as well as a list of suspicious messages submitted by users using the methods described herein. The interface can organize and prioritize reported messages. The interface can indicate, for reported messages, the reputational score of the reporting user. As described elsewhere herein, the console module can cluster messages according to common criteria or characteristics contained in a cluster module depicted in FIG. 9 and discussed in further detail below.

Figure 10:
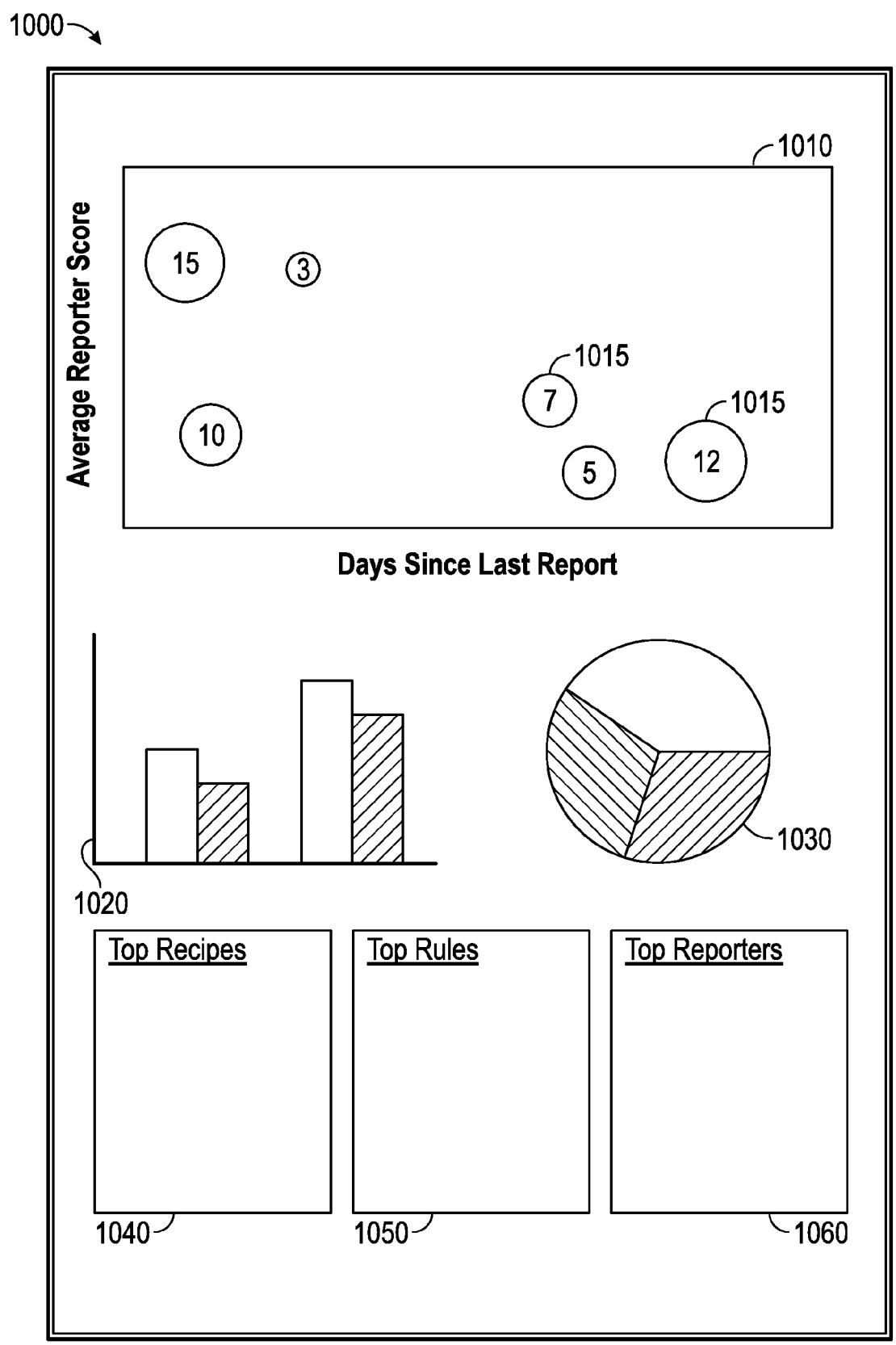
FIG. 10 illustrates an example console module dashboard view.

The console module provides invaluable resources to an analyst for acting on threats to an organization and is structured to allow the analyst to make quick and informed decisions based on information available to the system. An example of a console module (dashboard) is shown in FIG. 10. In FIG. 10, the dashboard 1000 may display a chart 1010 of all clusters 1015 from the cluster module. Each cluster 1015 may be plotted according to the days since the last report, as well as the average credibility score of all users in the cluster, though other graph dimensions are contemplated. Each cluster 1015 may also be presented as a shape having dimensions that correlate to additional cluster information. For example, each cluster 1015 may be a circle having a relative size based on the number of messages assigned to the cluster, and a color associated with a severity. In this respect, an analyst may quickly glean which clusters pose the biggest threat. For example, a larger cluster with a higher average credibility rating may take precedence over a smaller cluster with a lower average credibility rating. Each cluster 1015 may also be clickable, such that when clicked additional information about the messages assigned to the cluster is displayed in a cluster summary.

The dashboard 1000 may also display additional information that an analyst may find necessary for quickly processing incoming e-mail. For example, the dashboard 1000 may also display a bar graph 1020 depicting the number of manually and recipe matched rules over time, a pie chart 1030 depicting the relative categories of reported e-mails (e.g. non-malicious, spam, crimeware, advanced threats, and uncategorized), as well as any number of lists, such as a list of the top recipes 1040, a list of the top rules 1050, and a list of the top reporters 1060.

In an alternate view, the administrator may prefer a more text-based interface and may view the information in an administrator inbox. FIG. 15 illustrates an example administrator inbox 1500. While viewing the administrator inbox 1500 of the console module, the messages in this example are reported messages from a single user in a list format, illustrating credibility scores 1510 for the sources of the messages, rules matched 1520 by each reported message and the number and types of attachments 1530 for each message. Each line of the text-based view may be clickable, such that when clicked the analyst is displayed a message summary of the message that was clicked on, as shown in FIG. 12.

Figure 11:
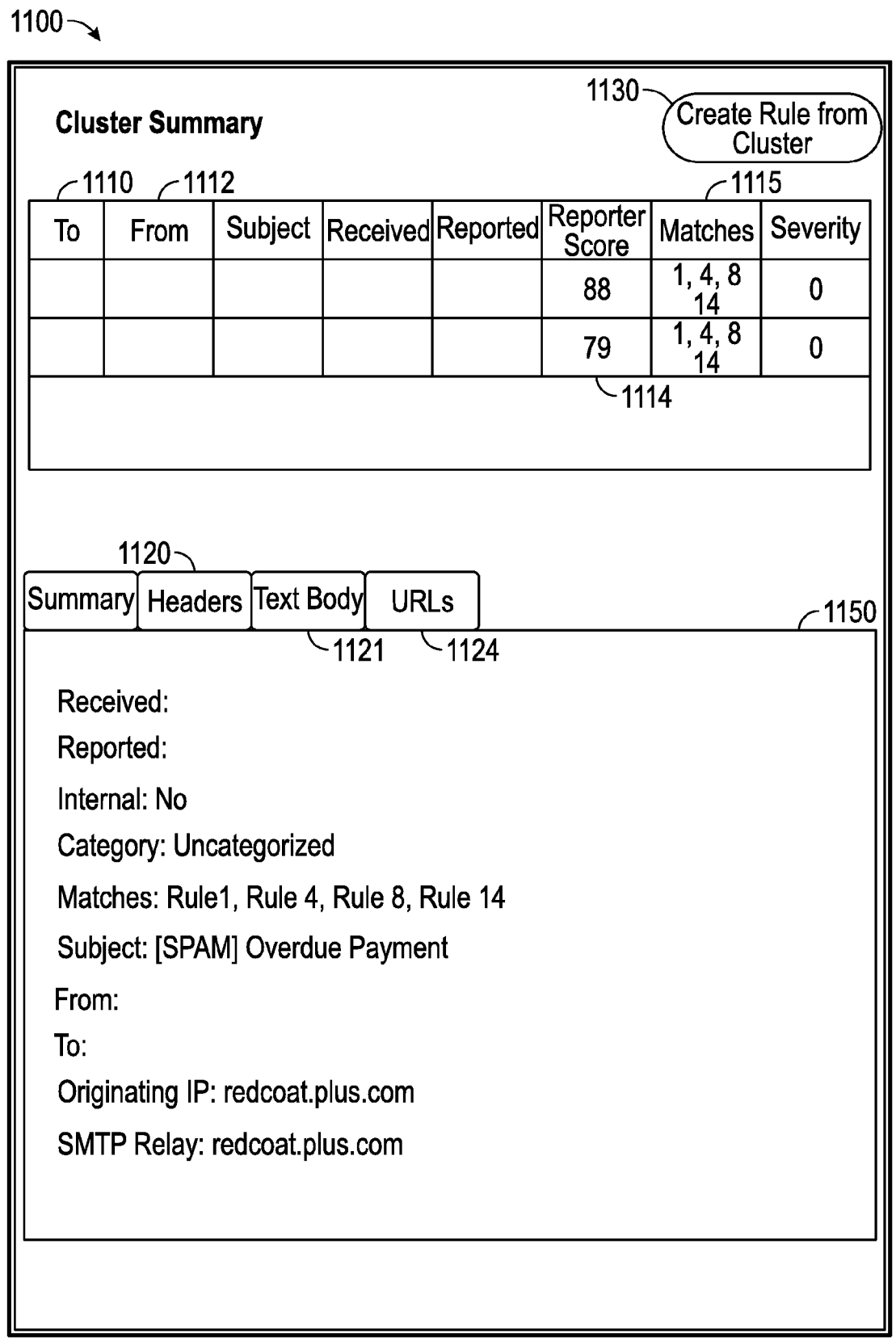
FIG. 11 illustrates an example cluster summary.

Returning to FIG. 10, upon clicking on any of the clusters 1015, the analyst is displayed a cluster summary. An example cluster summary 1100 is depicted in FIG. 11. The cluster summary 1100 may display a list of all messages assigned to the cluster. Each message may display a "to" address 1110, a "from" address 1112, a reporter score 1114, rule matches 1115, as well as any other data associated with the message such as a subject, a received time, a reported time, and a severity level. The cluster summary 1100 may also have a preview panel 1150 to preview an individual message from the list of messages. The preview panel 1150 may contain options to display message headers 1120, a text-only view 1121, as well as a URL option 1124 to display all URLs contained in the selected message. Clicking on any message in the list may cause the console module to display message summary information about the message that was clicked in the preview panel 1150, or open a new message summary. As detailed below, the cluster summary 1100 may also have a button 1130 or link to create a rule directly from the cluster.

Figure 12:
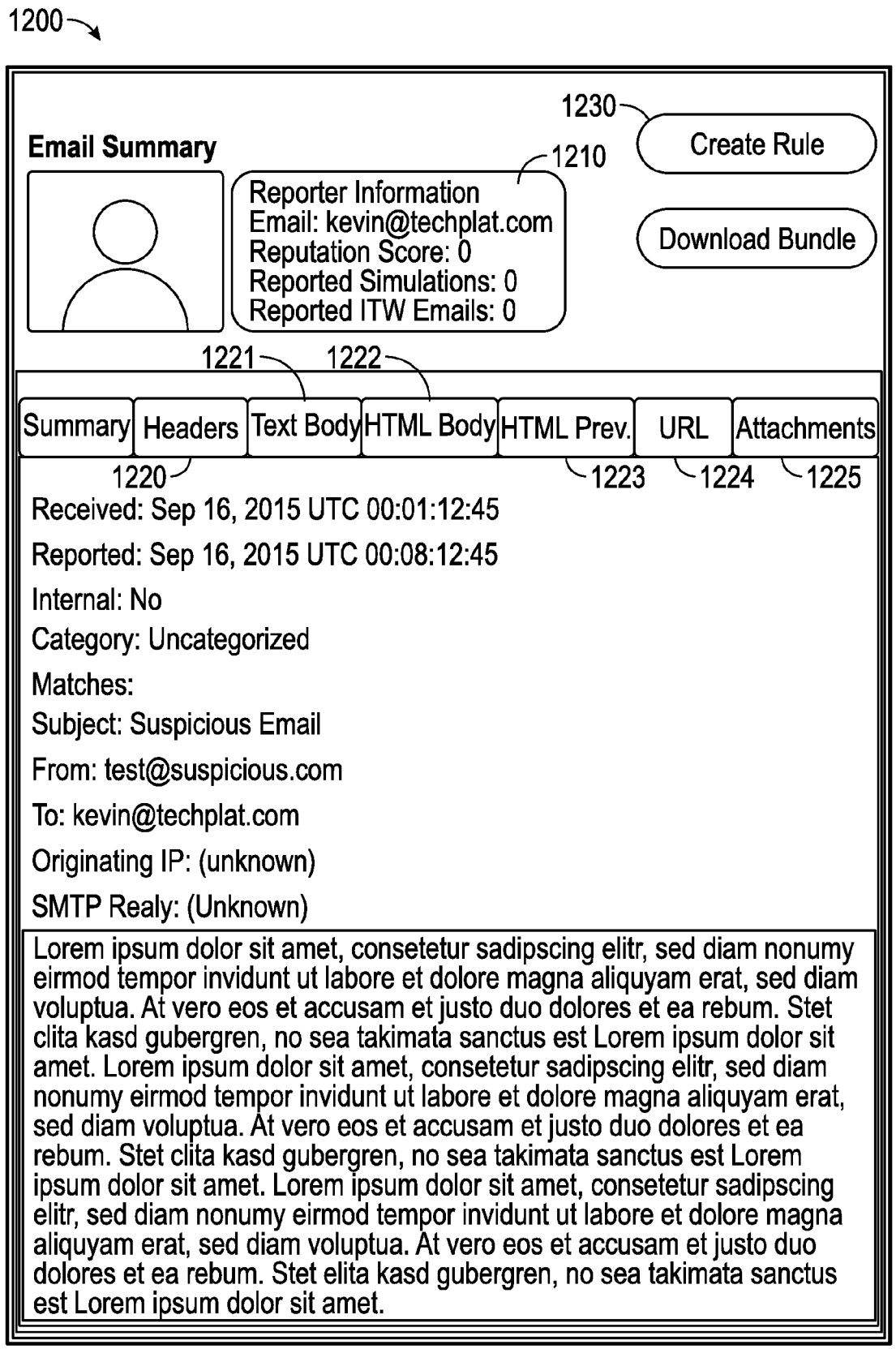
FIG. 12 illustrates an example reported message summary.

An example message summary 1200 is illustrated in FIG. 12. The message summary 1200 may indicate reporter information 1210, such as reporter e-mail address, reputation score, reported simulations and reported ITW emails. In some embodiments, the contents of a reported message are displayed to the administrator as a graphic without active links or text, such as a JPG image of the message to the administrator. Additionally, the console module may include options to display the message as a text-only format 1221, display the HTML code 1222, an HTML preview 1223, or the headers 1220 or other portions or formats for safe viewing and analysis of the message. Links may be displayed in a link option 1224. Images, and files contained within the message or as attachments may be extracted for separate viewing or analysis in an attachment option 1225. Certain options may be limited to specific personnel having credentials and requiring a password to access these options or to set a password for later opening of the files. The term administrator is used herein to indicate any individual with the role of monitoring and/or controlling the system, or computer instructions configured to perform the same tasks.

Both the cluster summary and the message summary may also have a rule creation button (button 1130 and button 1230). The rule creation button 1130 and/or button 1230 allow for the administrator to create a rule from the reported message, as will be discussed in detail below. The cluster summary and the message summary may also have a recipe creation button to create a recipe from the corresponding cluster or message, as will be discussed in further detail below.

Rules Module

The network server can include a rules module for the creation, modification, and application of rules to the messages reported. The rules applied to the messages can identify textual or binary patterns in message data, such as the body, headers, or attachments of a message using wildcards, case-insensitive strings, regular expressions, special operators, or other operations. In some embodiments, as a non-limiting example, the rules can be YARA rules. The rules can be used to detect malicious messages based on local threat information. In an example process flow, a message is received at the network server and is processed by the rules.

The system rules module can be configured to process the messages received at the network server that have been identified as suspicious by a user. For the received messages, the system can process the messages with a pattern matching tool, according to pattern matching rules provided to the system. As a non-limiting example, YARA can be used as the pattern matching tool.

By default, messages that are reported and not cleared by initial rules processing can be considered to be suspicious. Further processing can be used to determine whether the message is malicious. Rules can be used to determine whether a reported message is suspicious or malicious. As non-limiting examples, maliciousness may be determined based on any URLs in the message, the content of the site at the URL, or an attachment to the message.

The rules processing described above can be used to categorize messages. Based on the results of the rules processing, in some embodiments through the interdiction module, described herein, further actions can be taken. The further actions can be any arbitrary action. As non-limiting examples, based on a rule match, a message can be assigned a threat level. The threat level can be based on the severity or priority of the matching rule. The threat level can be used in further processing, or as a basis for further processing, such as sending an alert notification, sending the message to an integrated system for further analysis, or for triggering execution of an action in the recipes module described herein.

Any rule can be associated with a severity, priority, or similar tag. The tag can be used to color code or group messages or in clustering, as described in more detail herein. In some embodiments, the system can be provided with default YARA rules. The rules can also be provided by a feed from an external source or otherwise imported.

FIG. 13 depicts an interface 1300 for creating new rules. Parameters for rules can include some or all of: name 1310, severity value 1320, priority value, rule content 1330 (e.g., YARA rule), status (active/inactive). A drag and drop rules editor interface can be provided so that parameters from a reported message can be selected and incorporated into a rule. Furthermore, the administrator may select for the rule to be matched against the message or against the attachment 1340.

Turning to FIG. 14, if a rule is created from a reported message (e.g. the reported message in the message summary depicted in FIG. 12), the rule content 1430 may be prepopulated with meta-information from the reported message. For example, the rule content may include the sender email address and subject as strings to be used as a match condition.

As discussed in more detail below, messages can also be presented in clusters. An interface can be provided by which rules can be created from clusters of reported messages. Similar to creation of a rule from a reported message, a rule created from a cluster may have rule content that is common to all messages assigned to the cluster.

Some rules created may be content-specific, such as rules that match addressee names or domain names. In some embodiments, those rules can be stripped of personal identifiers and/or rendered anonymous before sharing, as described in more detail herein.

The rules module can also develop rules based upon reported files and extracted information from the reported messages. This feature can work in combination with the interdiction module. As a message meets specific reporting thresholds, the rules module can be automatically implemented or an administrator can implement the rules upon review. This can include extraction of header information, content information or any other information that the management console module is capable of extracting. The extraction can be automatic upon meeting a specific threshold, such as number of people reporting the same message or reporting user reputation score above a threshold. The system can then aggregate the similar characteristics or pattern matching to develop rules. These can include if specific headers are identified, attachments, links, message content or any other element that malware and virus scanning programs detect.

In embodiments that use an interdiction module, upon a rule being developed, the interdiction module can execute a quarantine of messages or the recipes module can execute actions with regard to any current or future messages that trigger this rule.

Recipes Module

A recipe is a set of one or more automated or executable actions or instructions that can be performed by the system in response to receipt of a report of a suspicious message. The system can include an interface for creating recipes 1600, such as illustrated in FIG. 16. A recipe can be associated with a name 1610, a description 1620, a status (active/inactive) 1630, keyword tag(s) 1640, etc. and be configured to perform actions including, but not limited to, any or all of categorizing a reported message, sending preconfigured response to the reporting user, sending a notification to others of the reported message. The system can also allow for the specification of arbitrary executable instructions to be performed as a part of the recipe. A recipe can be associated with one or more rules 1650, such as the rules described herein, and can be configured to cause execution of the specified instructions and/or activities upon the satisfaction of a rule. As a reported message is received, the message can be processed by the rules stored in the system. If the reported message satisfies all or a certain minimum of the rules associated with a recipe, that recipe will be performed on the reported message. Any of the recipe actions described herein can be performed on an individual reported message or a cluster of reported messages, as described elsewhere herein.

Users can have associated reputations, also referred to interchangeably as a reporter reputation, reporter reputation score, a reporter accuracy score, or reporter quality score. According to a recipe, the system can adjust the reporter reputation score points based on reporting activity by the user. An initial score can be assigned to users. The initial score can be based upon the background knowledge, education and experience of the user, such that a user with extensive experience in information security can have a much higher scored assigned initially than someone with less experience or education or training. An initial score can be zero, positive or negative or any other value used to rank user reporter reputation score. An initial score can be assigned to a user at a later time. For example, an initial score may not be assigned to a user until the user has conducted training for identifying malicious messages, or has been determined to have reported or been exposed to at least a certain number of messages at which time a score is assigned. After an initial score is assigned, a user may have the score increased for correctly reporting malicious messages, and have the score decreased for reporting legitimate messages as suspicious. Example scores may be advanced persistent threat (APT)=75 points; crimeware=10; non-malicious=−5; spam=−1; simulated phishing messages=+5 points.

Different users can have their scores adjusted differently, such as having multipliers for their knowledge level such as a basic user who reports a non-malicious message has the reputation score reduced by 5, while a system administrator or technical expert could lose a multiple of that. The system can also be configured to reduce the reputation score of a user who fails to report a suspicious message that user is known to have received, or received and opened, after a specific period of time has elapsed. Points can be reduced based on failing to report either a simulated phishing message generated as described herein or an actual malicious message. Points can also be reduced for reporting a legitimate message as well. Alternatively, if a user falls victim to a phishing attack or malicious message and reports it after the fact, this can have a different point value than reporting the message prior to falling victim. The user who fell victim to the message can also have their reporter reputation score adjusted differently even though they reported it because they fell victim. A recipe or rules can be configured to auto-reply to a user in response to receiving a report from that user. The auto-reply can be to indicate that the reported message is not, in fact, suspicious. Alternatively, the changes in scores can be different for different users. This can be based upon one or more factors such as the complexity of the malicious message, the experience, education or training of a user or their position or title.

If multiple users report copies of a message, or messages with the same identifying characteristics, this can result in a modifier of the normal score to the message. For example, instead of using the average score reputational score of the reporting users, there can be a modifier that increases the score if a certain number or percentage of users reports the message. This modifier can be changed the more users report or the more users with high reporter reputation scores report a message. This can be tied into the clustering of messages as well to allow increasing, or reduction of, the message score based upon how the message is clustered.

As a non-limiting example, a recipe could be used to resolve reports of suspicious messages and thereby prevent the report from appearing in the console inbox. For example, a rule may be created to match a legitimate message sent by the human resources department of an organization. A recipe can also be created that processes reports satisfying the rule by automatically responding to the user, indicating that the message is legitimate, and removing the message from display in the management console. As illustrated in FIG. 17, a recipe 1700 may also be created directly from a cluster summary (as in FIG. 11). A recipe 1700 created from a cluster summary may import criteria from the cluster (e.g. matched rules of the cluster) as a basis for the recipe execution. For example, recipe 1700 includes all rules 1750 corresponding to the cluster summary from which the recipe was created. As recipes are updated, the interdiction module can automatically be run to remove or block specific messages that match a recipe that is developed.

Response Manager

The system can include a response manager. The response manager can include an interface for composing responses to users who have submitted reports of suspicious messages. Using the response manager, various pre-composed responsive messages can be stored and later selected for sending to users. The response manager can also incorporate information relating to the reported message, such as but not limited to subject, reported time, and/or received time. The response manager can be implemented as a template with placeholders for these types of information, or others. The response to the user can include a report of the user's reputation or other metric indicating the past performance of a user in reporting suspicious messages. Responses can be electronic messages, such as emails. Responses can be automatically sent to users who report messages. The response can depend on any one or more of the reputation score of the user, title of the user, content of the message reported or recipes matched. Responses can be triggered by actions of other modules, such as the interdiction module, actions taken within the management console, or creation of recipes.

Message Interdiction Module

Figure 8:
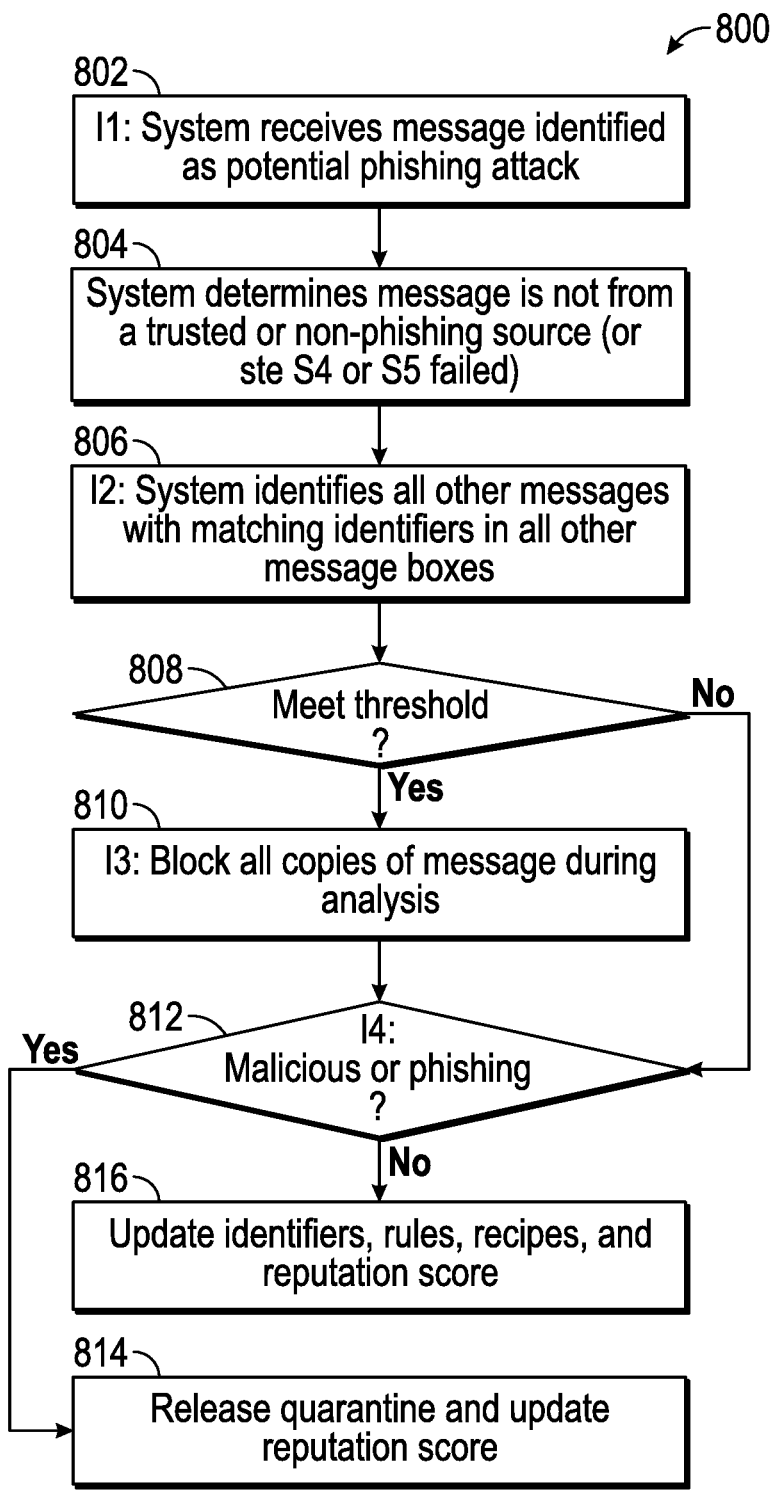
FIG. 8 illustrates an example process for message interdiction.

As discussed above, in some embodiments, the inbound mail server associated with the client (if one is used) may be configured to receive messages. The inbound server can be configured to store a local copy of substantially all of inbound messages, headers and other metadata associated with the messages, or a combination of both. In those embodiments, an interdiction module may be activated to process the incoming reported messages. A flow diagram 800 of an example interdiction module is shown in FIG. 8. Flow diagram 800 proceeds as follows:

In stage 802 (step I1), one or more identifying characteristics of the suspicious message are communicated to the inbound mail server. If the system determines that the message is not from a trusted or non-phishing source (or otherwise fails step S4 or S5 from another flow, e.g. of FIG. 6 or 7), as depicted at stage 804, flow 800 proceeds to stage 806. Otherwise, flow 800 proceeds as in FIG. 6.

In stage 806 (step I2), the inbound mail server can run a search on the existing mail stores and identify matching messages that have been sent to other users.

In a stage 808, the system then determines if the reputation score of the reporter is greater than some threshold. If so, the flow 800 proceeds to stage 810, otherwise flow 800 proceeds to stage 812.

In stage 810 (step I3), the inbound mail sever can generate a command to remove the matching messages from users' inboxes, trash folders, or similar storage, or otherwise render the message inaccessible to the user. In some embodiments, the interdiction module can provide a placeholder message that, if opened, states the message cannot be accessed because it is being analyzed. The system can automatically perform this step upon receiving a notification depending on a user's reputation score or title. Alternatively, the default can be automatic quarantine of all messages unless the reputation score is above a specific threshold value.

In a stage 812 (step I4), if the message is determined to be a non-malicious message, the interdiction module can return access to the messages to the users to whom it was denied during analysis in a stage 814. If, however, the message is determined to be malicious or a phishing attack, the messages can be permanently removed in a stage 816. The database and identifiers for known phishing and malicious messages is also updated. The system can provide a replacement message stating the message has been removed for an appropriate reason, such as it is a phishing message, it contained malicious code, or the message did not conform to workplace appropriate content. Additionally, the reputation score of the reporting user is also updated accordingly depending on the outcome of the message analysis.

The steps above can be performed by the inbound mail server or by a separate computing device in communication with the inbound mail server. The message interdiction module can be located on a client's premises or remotely. The interdiction module can also provide notification to the module responsible for maintaining the reporter reputation scores for individuals of any actions that have been taken by the individuals for the messages that are removed by it. Examples would be notifying the reporting module that the message had been opened, or moved to trash, or not opened. This information can be used by the reputation scoring module to adjust the reputation scores for the individuals according to any actions the individuals have taken.

The interdiction module can have threshold scores which must be met prior to automatic quarantining of messages occurs. Two such thresholds that can be used are sender credibility score and reporter reputation score. If the credibility score of the sender is above a set threshold, or the reporter reputation score is below a threshold (these thresholds can be the same or different values), automatic quarantining of messages is not activated. If, however, either threshold condition is met, messages can be quarantined. Alternatively, combinations of these two scores or other inputs, such as number of users who have reported the message, can be used to determine if automatic quarantining of messages should be effected based upon reporting of a message.

Smart Clustering

Messages can be clustered based on the application of rules to messages that have been reported as suspicious. As non-limiting examples, similarities for grouping purposes could be based on parameters such as message attachment name, time, hash of the attachment, a fuzzy hash, or any combination of parameters. Similarities can be identified based on application of YARA rules to messages. Parameters can be weighted and clusters formed based on weighted parameters. For example, as described above, users have reputation scores and messages can be clustered according to reputational similarity. The reputation score for use in clustering can be a cumulative average. Clustering can also be done according to the reputation or credibility score of a source. In some embodiments, the system can use a plagiarism detection system, n-gram analysis, or comparable system to identify similar phishing stories, flag corresponding messages as suspicious, and cluster messages so identified as embodying a similar phishing story.

Clusters can be defined based on certain parameters, and then messages matching those parameters can be grouped into those clusters. Messages can also be clustered according to recipes matched. Messages may also be clustered according to sender credibility score or reporter (user) reputation score. The reputation score may change each time a message is reported or after analysis of the reported message. The sender credibility score can also change as rules and recipes are created and enacted.

Figure 9:
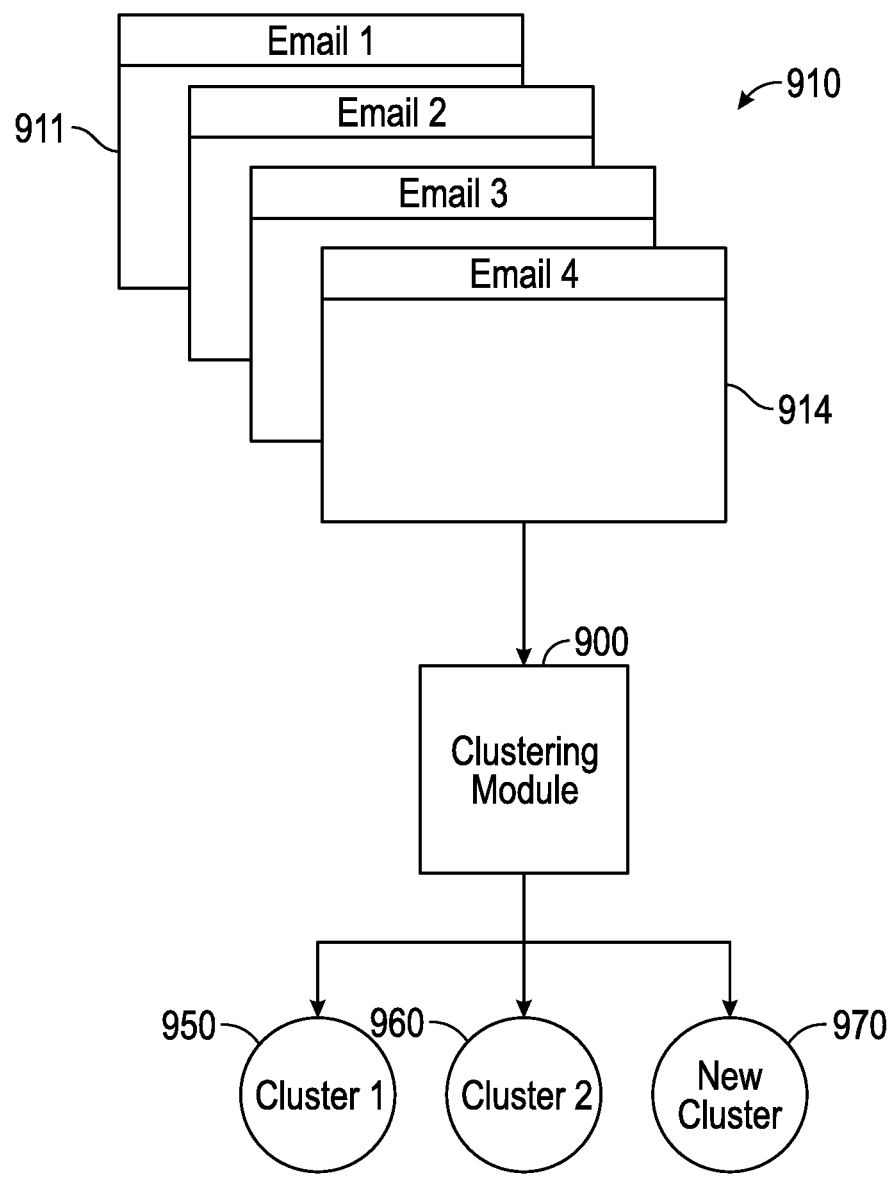
FIG. 9 illustrates an example system process for clustering messages.

An example clustering display is shown in FIG. 9. FIG. 9 shows a cluster module 900 that is capable of performing a cluster operation on incoming messages 910. The cluster module may perform a cluster operation to group similar messages, as described above. For example, one such cluster operation may be based on the average distance of the incoming message to all messages in each cluster, wherein a message may be assigned to at least one cluster if the average distance is below some threshold. To determine distance, each message 910 may be associated with a vector having a finite number dimensions, such that a distance between two messages may be defined as a norm of the difference of the vectors describing each. For example, dimensions of the vector may be associated with any number of rules, such that a binary one or zero is assigned to each dimension if the message matches the rule for that dimension or not. In this respect, the distance between two messages is the number of dissimilar rules between them. Here, two e-mails are "closer" together by having similar rules associated with each other.

For exemplary purposes, the clustering module 900 shown in FIG. 9 may indicate that message 1 911 should be assigned to cluster 2 960, as the average distance between message 1 911 and all messages assigned to cluster 2 960 is below some threshold. Further, message 1 911 may not be assigned to cluster 1 950, as the average distance to all messages assigned to cluster 1 950 may be above some threshold.

If one of the messages 910 is not sufficiently close to any of the clusters, the clustering module 900 may create a new cluster 970 and assign that message to the new cluster 970. For example, message 4 914 may match a multiple of rules which are not in common with any of the other clusters. The cluster module 900 may then indicate that message 4 914 should be classified under a new cluster 970 and assign message 4 914 to that cluster.

Other clustering techniques contemplated include k-means, deep learning (such as a convolutional neural network), or through various other machine learning techniques, such as natural language processing.

Once formed into clusters, the reported messages can be operated on as a group. The interface can provide any arbitrary functionality on the groups. As a non-limiting example, the cluster of messages can be categorized with a simplified user interface action. For example, the cluster of reported messages may be categorized as non-malicious, spam, advanced threat, crimeware (botnets), or aggregated or averaged reputational scores.

Clusters of messages can be assigned to a category, such as spam, and then re-categorized into a different category. Recategorization can be performed by manual user action by user selection of a cluster of messages and assigning the cluster to a different category. In some embodiments, the application of new or updated rules can cause individual messages or clusters of messages to be automatically recategorized. The responsive action can include re-attaching the original attachment for non-malicious messages. Responsive actions can also include sending a message to all users who have reported messages in that cluster. Some embodiments of the system can include an interface for forwarding a cluster of messages for further processing by one of the integrations, as described below.

Based on the category applied to a cluster of messages, user reputation scores can be updated. For example, if multiple messages are reported as a suspected phishing attack, based on common parameters of those messages, those messages may be clustered. If the messages in the cluster are subsequently determined to be non-malicious, the system can automatically update the reputational scores of the users who have reported the messages as suspicious.

Alerts can be based on clusters. For example, if 10 messages are clustered, and have met a threshold severity or priority, an alert can be generated. Once messages are formed into clusters, the clusters can be sorted based on cluster count. The system can provide an interface for creating a recipe from a cluster.

Information Sharing

The system can be configured to share rules and/or recipes with other installations of the system. In some embodiments, the system can communicate rules and/or recipes created at an installation to a centralized review facility. The centralized review facility can then communicate the rules to any number of other installations. In some cases, the centralized review facility can perform automated or manual quality assurance on the rules before communicating them to other installations.

In some embodiments, each external database can be considered a user. An external database can have trust and/or credibility scores related with it as well, similar to the reporter reputation scores for individuals. This allows the management console module to weigh the input it receives from the individual users from within the organization as well as the information from external sources. A database can have an overall score based upon who owns or runs it, such one run and developed by SANS™ or Norton™ can have a higher score associated with it than one developed by community users.

Some embodiments can include the feature of each entry within one of these external databases having reporter reputation scores developed in the same way as those within an organization. These scores can be combined together, weighted, and be compared to or used in combination with the scores of those individuals who have reported within an organization to determine if a message is malicious or not.

Some embodiments can include an anonymization proxy to enable sharing of rule/recipes anonymously with peer installations. For example, rules can be modified to remove identifying information such as the address of a message or an organization name. Some embodiments can be configured to share the name of the rule author and credit a user for sharing the rule. The performance of users who report and administrators who write successful rules can be tracked, and improvements on rules can be credited. In some embodiments, users may be associated with handles.

Integrations

Figure 18:
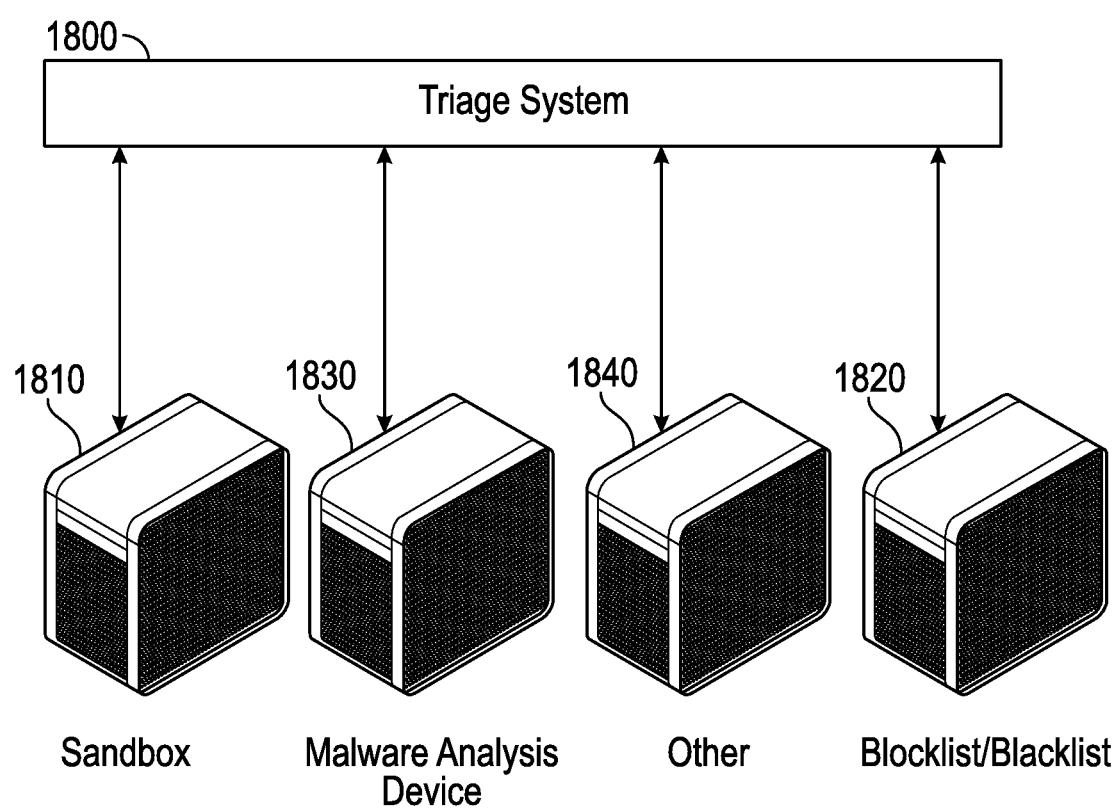
FIG. 18 illustrates various example integrations.

As shown in FIG. 18, the system 1800 may also be configured to forward information about a suspicious message from the management console to other hardware or software configured to take an action to secure a network from a threat derived from the suspicious message. The system can be configured to extract, from the suspicious message, the information and/or parameters to be input to another network security device. In some cases, the rules, described above, can be the inputs, with or without further modification. In some embodiments, the network security device may have an application program interface (API) for receiving rules, parameters, and/or other information on which action could be taken.

In some embodiments, a severity or priority for a message may be assigned, either manually or on the basis of rules, as described above. The severity or priority value can be associated with the threat information and can be input into the integrations. Data derived from collected message threat information can be further provided to a malware analysis device 1830 within the network to address threats at the perimeter, or malware analysis devices in other networks. In some embodiments, the threat information can be automatically provided to the network security device if the threat information is associated with a severity or priority level over a predetermined threshold.

The threat information derived from messages can be provided, by an API or other means, such as but not limited to an Indicator of Compromise (IOC), to a sandbox 1810, Aresight™, Splunk™, SIEM, or a logging system. As non-limiting examples of the further processing that may be performed by the network security device, sandboxing systems can be used to evaluate attachments, URL analysis (sandboxing), and virus data lookups (VirusTotal™). When viewing a reported message that has an attachment, an "Attachments" button can be provided for a user to manually initiate an integration to a sandbox analyzer for detonation, such as one offered by FireEye™, ThreatGrid™, or Cukoo™, or to a virus or other static malware checking service, such as VirusTotal™, etc.

The threat information can also be provided to blocklists and/or blacklists 1820. For example, information relating to certain message addresses, IP addresses, and URLs can be provided. As discussed above, phishing attack messages may include a URL and a suggestion to a recipient to access content at that URL. URLs identified using rules, recipes, or by manual identification can be provided to a network security device, such as a firewall, to enable blocking of those URLs.

The system 1800 may provide message data to other integrations 1840, as well. For example, other integrations 1840 may include machine learning and/or natural language processing APIs. Furthermore, other integrations 1840 may also include querying a service for the latest known security threats. Combined, the other integrations 1840 may characterize a reported e-mail as "good" or "bad", i.e. determine with some probabilistic determination whether the reported e-mail is generally malicious or non-malicious to aid an administrator in responding to threats. Alternatively, the characterization of a message as "good" or "bad" may cause the system to automatically perform some action on the message (e.g., quarantine), or otherwise automate the functions of the administrator.

System Architectures

The systems and methods described herein can be implemented in software or hardware or any combination thereof. The systems and methods described herein can be implemented using one or more computing devices which may or may not be physically or logically separate from each other. The methods may be performed by components arranged as either on-premise hardware, on premise virtual systems, or hosted-private instances. Additionally, various aspects of the methods described herein may be combined or merged into other functions. Example computerized systems for implementing the invention is illustrated in FIGS. 1-3. A processor or computer system can be configured to particularly perform some or all of the method described herein. In some embodiments, the method can be partially or fully automated by one or more computers or processors. The invention may be implemented using a combination of any of hardware, firmware and/or software. The present invention (or any part(s) or function(s) thereof) may be implemented using hardware, software, firmware, or a combination thereof and may be implemented in one or more computer systems or other processing systems. In some embodiments, the illustrated system elements could be combined into a single hardware device or separated into multiple hardware devices. If multiple hardware devices are used, the hardware devices could be physically located proximate to or remotely from each other. The embodiments of the methods described and illustrated are intended to be illustrative and not to be limiting. For example, some or all of the steps of the methods can be combined, rearranged, and/or omitted in different embodiments.

In one exemplary embodiment, the invention may be directed toward one or more computer systems capable of carrying out the functionality described herein. Example computing devices may be, but are not limited to, a personal computer (PC) system running any operating system such as, but not limited to, Microsoft™ Windows™. However, the invention may not be limited to these platforms. Instead, the invention may be implemented on any appropriate computer system running any appropriate operating system. Other components of the invention, such as, but not limited to, a computing device, a communications device, mobile phone, a telephony device, a telephone, a personal digital assistant (PDA), a personal computer (PC), a handheld PC, an interactive television (iTV), a digital video recorder (DVD), client workstations, thin clients, thick clients, proxy servers, network communication servers, remote access devices, client computers, server computers, routers, web servers, data, media, audio, video, telephony or streaming technology servers, etc., may also be implemented using a computing device. Services may be provided on demand using, e.g., but not limited to, an interactive television (iTV), a video on demand system (VOD), and via a digital video recorder (DVR), or other on demand viewing system.

The system may include one or more processors. The processor(s) may be connected to a communication infrastructure, such as but not limited to, a communications bus, cross-over bar, or network, etc. The processes and processors need not be located at the same physical locations. In other words, processes can be executed at one or more geographically distant processors, over for example, a LAN or WAN connection. Computing devices may include a display interface that may forward graphics, text, and other data from the communication infrastructure for display on a display unit.

The computer system may also include, but is not limited to, a main memory, random access memory (RAM), and a secondary memory, etc. The secondary memory may include, for example, a hard disk drive and/or a removable storage drive, such as a compact disk drive CD-ROM, etc. The removable storage drive may read from and/or write to a removable storage unit. As may be appreciated, the removable storage unit may include a computer usable storage medium having stored therein computer software and/or data. In some embodiments, a machine-accessible medium may refer to any storage device used for storing data accessible by a computer. Examples of a machine-accessible medium may include, e.g., but not limited to: a magnetic hard disk; a floppy disk; an optical disk, like a compact disk read-only memory (CD-ROM) or a digital versatile disk (DVD); a magnetic tape; and/or a memory chip, etc.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The processing system can be in communication with a computerized data storage system. The data storage system can include a non-relational or relational data store, such as a MySQL™ or other relational database. Other physical and logical database types could be used. The data store may be a database server, such as Microsoft SQL Server™, Oracle™, IBM DB2™, SQLITE™, or any other database software, relational or otherwise. The data store may store the information identifying syntactical tags and any information required to operate on syntactical tags. In some embodiments, the processing system may use object-oriented programming and may store data in objects. In these embodiments, the processing system may use an object-relational mapper (ORM) to store the data objects in a relational database. The systems and methods described herein can be implemented using any number of physical data models. In one example embodiment, an RDBMS can be used. In those embodiments, tables in the RDBMS can include columns that represent coordinates. In the case of economic systems, data representing companies, products, etc. can be stored in tables in the RDBMS. The tables can have pre-defined relationships between them. The tables can also have adjuncts associated with the coordinates.

In alternative exemplary embodiments, secondary memory may include other similar devices for allowing computer programs or other instructions to be loaded into computer system. Such devices may include, for example, a removable storage unit and an interface. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units and interfaces, which may allow software and data to be transferred from the removable storage unit to computer system.

The computing device may also include an input device such as but not limited to, a mouse or other pointing device such as a digitizer, and a keyboard or other data entry device (not shown). The computing device may also include output devices, such as but not limited to, a display, and a display interface. Computer may include input/output (I/O) devices such as but not limited to a communications interface, cable and communications path, etc. These devices may include, but are not limited to, a network interface card, and modems. Communications interface may allow software and data to be transferred between computer system and external devices.

In one or more embodiments, the present embodiments are practiced in the environment of a computer network or networks. The network can include a private network, or a public network (for example the Internet, as described below), or a combination of both. The network includes hardware, software, or a combination of both.

From a telecommunications-oriented view, the network can be described as a set of hardware nodes interconnected by a communications facility, with one or more processes (hardware, software, or a combination thereof) functioning at each such node. The processes can inter-communicate and exchange information with one another via communication pathways between them using interprocess communication pathways. On these pathways, appropriate communications protocols are used.

An exemplary computer and/or telecommunications network environment in accordance with the present embodiments may include nodes, which may include hardware, software, or a combination of hardware and software. The nodes may be interconnected via a communications network. Each node may include one or more processes, executable by processors incorporated into the nodes. A single process may be run by multiple processors, or multiple processes may be run by a single processor, for example. Additionally, each of the nodes may provide an interface point between network and the outside world, and may incorporate a collection of sub-networks.

In an exemplary embodiment, the processes may communicate with one another through interprocess communication pathways supporting communication through any communications protocol. The pathways may function in sequence or in parallel, continuously or intermittently. The pathways can use any of the communications standards, protocols or technologies, described herein with respect to a communications network, in addition to standard parallel instruction sets used by many computers.

The nodes may include any entities capable of performing processing functions. Examples of such nodes that can be used with the embodiments include computers (such as personal computers, workstations, servers, or mainframes), handheld wireless devices and wireline devices (such as personal digital assistants (PDAs), modem cell phones with processing capability, wireless email devices including BlackBerry™ devices), document processing devices (such as scanners, printers, facsimile machines, or multifunction document machines), or complex entities (such as local-area networks or wide area networks) to which are connected a collection of processors, as described. For example, in the context of the present invention, a node itself can be a wide-area network (WAN), a local-area network (LAN), a private network (such as a Virtual Private Network (VPN)), or collection of networks.

Communications between the nodes may be made possible by a communications network. A node may be connected either continuously or intermittently with communications network. As an example, in the context of the present invention, a communications network can be a digital communications infrastructure providing adequate bandwidth and information security.

The communications network can include wireline communications capability, wireless communications capability, or a combination of both, at any frequencies, using any type of standard, protocol or technology. In addition, in the present embodiments, the communications network can be a private network (for example, a VPN) or a public network (for example, the Internet).

A non-inclusive list of exemplary wireless protocols and technologies used by a communications network may include BlueTooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

Embodiments of the present invention may include apparatuses for performing the operations herein. An apparatus may be specially constructed for the desired purposes, or it may comprise a general purpose device selectively activated or reconfigured by a program stored in the device.

In one or more embodiments, the present embodiments are embodied in machine-executable instructions. The instructions can be used to cause a processing device, for example a general-purpose or special-purpose processor, which is programmed with the instructions, to perform the steps of the present invention. Alternatively, the steps of the present invention can be performed by specific hardware components that contain hardwired logic for performing the steps, or by any combination of programmed computer components and custom hardware components. For example, the present invention can be provided as a computer program product, as outlined above. In this environment, the embodiments can include a machine-readable medium having instructions stored on it. The instructions can be used to program any processor or processors (or other electronic devices) to perform a process or method according to the present exemplary embodiments. In addition, the present invention can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals may be stored on the computer systems for subsequent execution).

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as an LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as Flash™, JAVA™, C++, C, C#, Python, Visual Basic™, JavaScript™ PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™, iOS™, Unix™/X-Windows™, Linux™ etc. The system could be implemented using a web application framework, such as Ruby on Rails.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The systems, modules, and methods described herein can be implemented using any combination of software or hardware elements. The systems, modules, and methods described herein can be implemented using one or more virtual machines operating alone or in combination with one other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the invention may be practiced with other computer system configurations, including hand-held devices, microprocessor systems, microprocessor-based or programmable consumer electronics, minicomputers, mainframe computers, etc. The invention may also be practiced in distributed computing environments where tasks are performed by remote processing devices that are linked through a network.

The terms "computer program medium" and "computer readable medium" may be used to generally refer to media such as but not limited to removable storage drive, a hard disk installed in hard disk drive. These computer program products may provide software to computer system. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the description and claims, the terms "coupled" and "connected," along with their derivatives, may be used. It should be understood that these terms may be not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm may be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently.

While one or more embodiments of the invention have been described, various alterations, additions, permutations and equivalents thereof are included within the scope of the invention.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

What is claimed is:

1. A computerized method for message processing, comprising:
    generating a simulated phishing message for use in a simulation platform, the message comprising an identifier in the message or in metadata of the message, wherein the simulated phishing message is a non-malicious message that resembles a phishing attack, and wherein the identifier is encrypted or encoded by the simulation platform;
    receiving a notification triggered by a user action by an individual that a message delivered in an account associated with the individual has been identified by the individual as a possible phishing attack;
    providing a computer-executable instructions for a messaging client at, the computer-executable instructions configurable for determining whether the delivered message is a known simulated phishing attack based on the encrypted or encoded identifier of the delivered message;
    when the delivered message is determined not to be a known simulated phishing attack based on the encrypted or encoded identifier, then:
    receiving the delivered message at the simulation platform;
    processing the delivered message at the simulation platform according to a set of electronically stored rules to determine whether the delivered message or attachment data of the delivered message contains defined textual or binary patterns associated with a threat;
    assigning a priority to the delivered message based on a likelihood of the delivered message being a real phishing attack;
    associating the delivered message with a message cluster based on the processing according to the rules, the message cluster being defined as a group of messages having at least one characteristic in common with the delivered message; and
    displaying a graphical representation of the message cluster, each of the group of messages displayed having been determined not to be a known simulated phishing attack.

2. The method of claim 1, further comprising displaying a grouping of messages as a cluster, wherein the cluster comprises a plurality of messages having at least one common characteristic among the grouping of messages.

3. The method of claim 1, wherein messages are grouped into clusters according to a sender credibility score associated with the messages or a reporter reputation score associated with the messages.

4. The method of claim 1, further comprising displaying the message cluster of messages as a circle having a relative size based on a number of messages assigned to the message cluster.

5. The method of claim 4, wherein a color is associated with a threat severity for the displayed message cluster and the message cluster is rendered in the associated color.

6. The method of claim 1, further comprising displaying multiple message clusters, wherein each message cluster is displayed as a shape having a relative size indicating a number of messages in each message cluster and each message cluster is rendered in a color associated with a message cluster priority.

7. The method of claim 6, wherein each message cluster is displayed as an active link which, when selected, displays additional information about the selected message cluster.

8. The method of claim 1, further comprising performing an operation on one or more messages in the message cluster, wherein the operation comprises one of deleting the message from a user inbox, quarantining the message from a user inbox, classifying the message, and responding to the message.

9. The method of claim 1, wherein the delivered message is classified as malicious if the delivered message is assigned to a message cluster having a threshold number of messages, each message being associated with a minimum reputation score.

10. The method of claim 1, wherein the delivered message is classified as non-malicious based on a determination that the message cluster to which the delivered message is assigned is non-malicious.

11. The method of claim 1, further comprising executing an integration, wherein the integration comprises one or more of opening a link contained in the delivered message data in a simulated environment, opening attachment data in a simulated environment, and scanning the delivered message for malicious content, and querying a database of known threat activity with data extracted from the delivered message.

12. The method of claim 1, further comprising providing an interface for creating a rule from the message cluster, wherein the created rule is met by a threshold number of messages in the message cluster.

13. The method of claim 1, further comprising providing an interface for creating a set of executable instructions based on at least one characteristic of at least one message from a corresponding message cluster.

14. The method of claim 1, further comprising providing an interface for specifying one or more rules for automatically responding to a notification by a pre-configured response message.

15. The method of claim 1, wherein if the delivered message is determined to be a known simulated phishing attack, providing feedback to the individual confirming that the delivered message was a simulated phishing attack.

16. The method of claim 1, further comprising comparing the delivered message against stored rules for determining whether the delivered message or associated attachment data contains a pre-defined a textual or pre-defined binary pattern.

17. The method of claim 1, further comprising enabling access to a message server for removing messages from messaging accounts associated with multiple users.

18. The method of claim 17, wherein at least a portion of a message body of the delivered message or at least a portion of header information of the delivered message or at least a portion of metadata of the delivered message is communicated for threat processing.

19. The method of claim 17, further comprising removing one or more messages from messaging accounts associated with multiple users based on a matching of at least a portion of header information of the delivered message or at least a portion of metadata of the delivered message with the one or more messages from the messaging accounts associated with the multiple users.

20. The method of claim 16, further comprising executing a remedial action on a network device based on the comparison of the delivered message against stored rules for determining whether message or attachment data contains a pre-defined textual or a pre-defined binary pattern.

21. The method of claim 1, further comprising processing the delivered message according to a pre-defined rule configured to process messages received at a network server that have been identified as suspicious by a user.

22. The method of claim 21, further comprising processing the delivered message by pattern matching according to pattern matching rules to detect malicious messages based on local threat information.

23. The method of claim 22, further comprising labeling as suspicious messages that are not cleared by initial rules pattern matching processing.

24. The method of claim 23, further comprising grouping the messages labeled as suspicious in a cluster of suspicious messages.

25. The method of claim 1, wherein if multiple users identify multiple copies of a message, the copies having an identical identifying characteristic, increasing a threat score for the messages having the identical identifying characteristic; and processing the multiple copies of the message according to the threat score.

26. The method of claim 1, further comprising:

creating a rule to match a legitimate message sent by an internal department of an organization; and suppressing display on a console of all messages matching the legitimate message rule.

27. The method of claim 1, further comprising automatically responding to a user with a message indicating that the delivered message is legitimate, and removing the delivered message from display in a management console.

28. The method of claim 1, further comprising configuring an inbound mail sever to generate a command to remove one or more messages to render the delivered message inaccessible to the user.

29. The method of claim 28, further comprising generating a command to remove one or more messages from a user inbox based on a threshold score, sender credibility score, or threshold reporter reputation score.

30. The method of claim 1, further comprising sharing a rule or executable instruction with another installation via a centralized rule or instruction review facility.

* * * * *